(12) United States Patent
Kasagi

(10) Patent No.: US 10,558,730 B2
(45) Date of Patent: Feb. 11, 2020

(54) COMPUTING METHOD, INFORMATION PROCESSING APPARATUS, COMPUTING PROGRAM, AND INFORMATION PROCESSING SYSTEM

(71) Applicant: FUJITSU LIMITED, Kawasaki-shi, Kanagawa (JP)

(72) Inventor: Akihiko Kasagi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 34 days.

(21) Appl. No.: 15/894,995

(22) Filed: Feb. 13, 2018

(65) Prior Publication Data

US 2018/0246854 A1 Aug. 30, 2018

(30) Foreign Application Priority Data

Feb. 24, 2017 (JP) .................. 2017-033409

(51) Int. Cl.
*G06F 17/16* (2006.01)
(52) U.S. Cl.
CPC .................. *G06F 17/16* (2013.01)
(58) Field of Classification Search
CPC ....................................................... G06F 17/16
USPC ........................................................ 708/520
See application file for complete search history.

(56) References Cited

U.S. PATENT DOCUMENTS

2017/0228341 A1* 8/2017 Narayanaswami ..... G06F 17/16

FOREIGN PATENT DOCUMENTS

JP H06-175986 6/1994

OTHER PUBLICATIONS

Lee, Hyuk-Jae et al.,"Generalized Cannon's Algorithm for Parallel Matrix Multiplication", Proceedings of the 1997 International Conference on Supercomputing, Vienna, AT, Jul. 11, 1997, pp. 44-51, XP058242329.
Piano, Cristiana, "The problem of small and large matrices in parallel Matrix Multiplication", Parallel Algorithms and Applications, vol. 18, No. 1-2, May 2003, pp. 71-89, XP055497108.
Li, J. et al.,"A poly-algorithm for parallel dense matrix multiplication on two-dimensional process grid topologies", Concurency: Practice and Experience, vol. 9, No. 5, May 1997, pp. 345-389, XP055497109.

(Continued)

*Primary Examiner* — Tan V Mai
(74) *Attorney, Agent, or Firm* — Fujitsu Patent Center

(57) ABSTRACT

A computing method includes: generating first partitioned matrices by partitioning the first matrix by a least common multiple of the M and the N in the row direction and by the N in the column direction; generating second partitioned matrices by partitioning the second matrix by the M in the row direction and by the least common multiple in the column direction; adding a first product of the first partitioned matrices and the second partitioned matrices to a first result matrix; transmitting the first partitioned matrices to computing elements directly connected to that computing element out of other computing elements connected to each other in a torus-like manner in the row direction; transmitting the second partitioned matrices to computing elements directly connected to that computing element out of other computing elements connected to each other in a torus-like manner in the column direction.

12 Claims, 30 Drawing Sheets

(56) References Cited

OTHER PUBLICATIONS

Baransel, Cesur et al.,"A New Parallel Matrix Multiplication Algorithm for Wormhole-Routed All-Port 2D/3D Torus Networks", In: "Mathematical Methods in Engineering", 2014, Springer Netherlands, Dordrecht, XP055497110, pp. 13-21.
Solomonik, Edgar et al.,"Matrix Multiplication on Multidimensional Torus Networks", Jul. 17, 2012, High Performance Computing for Computational Science—VECPAR 2012, pp. 201-215, XP047029313.
Maruyama, Takumi, "Fujitsu HPC and AI Processors", Slides of presentation at ISC 2017, Jun. 20, 2017, XP055496802, Retrieved from the Internet: URL: http://www.fujitsu.com/global/Images/fujitsu-hpc-and-ai-processors.pdf [retrieved on Aug. 1, 2018].
Extended European Search Report dated Aug. 9, 2018 for corresponding European Patent Application No. 18156090.5, 15 pages.

\* cited by examiner

| B0 | B37 | B26 | B15 |
| --- | --- | --- | --- |
| B4 | B41 | B30 | B19 |
| B8 | B45 | B34 | B23 |
| B12 | B1 | B38 | B27 |
| B16 | B5 | B42 | B31 |
| B20 | B9 | B46 | B35 |
| B24 | B13 | B2 | B39 |
| B28 | B17 | B6 | B43 |
| B32 | B21 | B10 | B47 |
| B36 | B25 | B14 | B3 |
| B40 | B29 | B18 | B7 |
| B44 | B33 | B22 | B11 |

MC:

| C0 | C1 | C2 | C3 |
| --- | --- | --- | --- |
| C4 | C5 | C6 | C7 |
| C8 | C9 | C10 | C11 |
| C12 | C13 | C14 | C15 |
| C16 | C17 | C18 | C19 |
| C20 | C21 | C22 | C23 |

MA:

| A0 | A1 | A2 | A3 | A4 | A5 | A6 | A7 | A8 | A9 | A10 | A11 |
| --- | --- | --- | --- | --- | --- | --- | --- | --- | --- | --- | --- |
| A22 | A23 | A12 | A13 | A14 | A15 | A16 | A17 | A18 | A19 | A20 | A21 |
| A32 | A33 | A34 | A35 | A24 | A25 | A26 | A27 | A28 | A29 | A30 | A31 |
| A42 | A43 | A44 | A45 | A46 | A47 | A36 | A37 | A38 | A39 | A40 | A41 |
| A52 | A53 | A54 | A55 | A56 | A57 | A58 | A59 | A48 | A49 | A50 | A51 |
| A62 | A63 | A64 | A65 | A66 | A67 | A68 | A69 | A70 | A71 | A60 | A61 |

| B44 | B33 | B22 | B11 |
|---|---|---|---|
| B40 | B29 | B18 | B7 |
| B36 | B25 | B14 | B3 |
| B32 | B21 | B10 | B47 |
| B28 | B17 | B6 | B43 |
| B24 | B13 | B2 | B39 |
| B20 | B9 | B46 | B35 |
| B16 | B5 | B42 | B31 |
| B12 | B1 | B38 | B27 |
| B8 | B45 | B34 | B23 |
| B4 | B41 | B30 | B19 |
| B0 | B37 | B26 | B15 |

MC:

| C0 | C1 | C2 | C3 |
|---|---|---|---|
| C4 | C5 | C6 | C7 |
| C8 | C9 | C10 | C11 |
| C12 | C13 | C14 | C15 |
| C16 | C17 | C18 | C19 |
| C20 | C21 | C22 | C23 |

MA:

| A0 | A1 | A2 | A3 | A4 | A5 | A6 | A7 | A8 | A9 | A10 | A11 |
|---|---|---|---|---|---|---|---|---|---|---|---|
| A22 | A23 | A12 | A13 | A14 | A15 | A16 | A17 | A18 | A19 | A20 | A21 |
| A32 | A33 | A34 | A35 | A24 | A25 | A26 | A27 | A28 | A29 | A30 | A31 |
| A42 | A43 | A44 | A45 | A46 | A47 | A36 | A37 | A38 | A39 | A40 | A41 |
| A52 | A53 | A54 | A55 | A56 | A57 | A58 | A59 | A48 | A49 | A50 | A51 |
| A62 | A63 | A64 | A65 | A66 | A67 | A68 | A69 | A70 | A71 | A60 | A61 |

| B0 | B1 | B2 | B3 | B4 | B5 | B6 | B7 |
|---|---|---|---|---|---|---|---|
| B8 | B9 | B10 | B11 | B12 | B13 | B14 | B15 |
| B16 | B17 | B18 | B19 | B20 | B21 | B22 | B23 |
| B24 | B25 | B26 | B27 | B28 | B29 | B30 | B31 |
| B32 | B33 | B34 | B35 | B36 | B37 | B38 | B39 |
| B40 | B41 | B42 | B43 | B44 | B45 | B46 | B47 |
| B48 | B49 | B50 | B51 | B52 | B53 | B54 | B55 |
| B56 | B57 | B58 | B59 | B60 | B61 | B62 | B63 |
| B64 | B65 | B66 | B67 | B68 | B69 | B70 | B71 |
| B72 | B73 | B74 | B75 | B76 | B77 | B78 | B79 |
| B80 | B81 | B82 | B83 | B84 | B85 | B86 | B87 |
| B88 | B89 | B90 | B91 | B92 | B93 | B94 | B95 |
| B96 | B97 | B98 | B99 | B100 | B101 | B102 | B103 |
| B104 | B105 | B106 | B107 | B108 | B109 | B110 | B111 |
| B112 | B113 | B114 | B115 | B116 | B117 | B118 | B119 |
| B120 | B121 | B122 | B123 | B124 | B125 | B126 | B127 |
| B128 | B129 | B130 | B131 | B132 | B133 | B134 | B135 |
| B136 | B137 | B138 | B139 | B140 | B141 | B142 | B143 |
| B144 | B145 | B146 | B147 | B148 | B149 | B150 | B151 |
| B152 | B153 | B154 | B155 | B156 | B157 | B158 | B159 |
| B160 | B161 | B162 | B163 | B164 | B165 | B166 | B167 |
| B168 | B169 | B170 | B171 | B172 | B173 | B174 | B175 |
| B176 | B177 | B178 | B179 | B180 | B181 | B182 | B183 |
| B184 | B185 | B186 | B187 | B188 | B189 | B190 | B191 |

MC:

| C0 | C1 | C2 | C3 | C4 | C5 | C6 | C7 |
|---|---|---|---|---|---|---|---|
| C8 | C9 | C10 | C11 | C12 | C13 | C14 | C15 |
| C16 | C17 | C18 | C19 | C20 | C21 | C22 | C23 |
| C24 | C25 | C26 | C27 | C28 | C29 | C30 | C31 |
| C32 | C33 | C34 | C35 | C36 | C37 | C38 | C39 |
| C40 | C41 | C42 | C43 | C44 | C45 | C46 | C47 |

MA:

| A0 | A1 | A2 | A3 | A4 | A5 | A6 | A7 | A8 | A9 | A10 | A11 |
|---|---|---|---|---|---|---|---|---|---|---|---|
| A12 | A13 | A14 | A15 | A16 | A17 | A18 | A19 | A20 | A21 | A22 | A23 |
| A24 | A25 | A26 | A27 | A28 | A29 | A30 | A31 | A32 | A33 | A34 | A35 |
| A36 | A37 | A38 | A39 | A40 | A41 | A42 | A43 | A44 | A45 | A46 | A47 |
| A48 | A49 | A50 | A51 | A52 | A53 | A54 | A55 | A56 | A57 | A58 | A59 |
| A60 | A61 | A62 | A63 | A64 | A65 | A66 | A67 | A68 | A69 | A70 | A71 |

MB table:

| B96 | B97 | B98 | B99 |
| --- | --- | --- | --- |
| B104 | B105 | B106 | B107 |
| B112 | B113 | B114 | B115 |
| B120 | B121 | B122 | B123 |
| B128 | B129 | B130 | B131 |
| B136 | B137 | B138 | B139 |
| B144 | B145 | B146 | B147 |
| B152 | B153 | B154 | B155 |
| B160 | B161 | B162 | B163 |
| B168 | B169 | B170 | B171 |
| B176 | B177 | B178 | B179 |
| B184 | B185 | B186 | B187 |

MC table:

| C0 | C1 | C2 | C3 |
| --- | --- | --- | --- |
| C8 | C9 | C10 | C11 |
| C16 | C17 | C18 | C19 |
| C24 | C25 | C26 | C27 |
| C32 | C33 | C34 | C35 |
| C40 | C41 | C42 | C43 |

MA table:

| A0 | A1 | A2 | A3 | A4 | A5 | A6 | A7 | A8 | A9 | A10 | A11 |
| --- | --- | --- | --- | --- | --- | --- | --- | --- | --- | --- | --- |
| A12 | A13 | A14 | A15 | A16 | A17 | A18 | A19 | A20 | A21 | A22 | A23 |
| A24 | A25 | A26 | A27 | A28 | A29 | A30 | A31 | A32 | A33 | A34 | A35 |
| A36 | A37 | A38 | A39 | A40 | A41 | A42 | A43 | A44 | A45 | A46 | A47 |
| A48 | A49 | A50 | A51 | A52 | A53 | A54 | A55 | A56 | A57 | A58 | A59 |
| A60 | A61 | A62 | A63 | A64 | A65 | A66 | A67 | A68 | A69 | A70 | A71 |

COMPUTING METHOD, INFORMATION PROCESSING APPARATUS, COMPUTING PROGRAM, AND INFORMATION PROCESSING SYSTEM

CROSS-REFERENCE TO RELATED APPLICATION

This application is based upon and claims the benefit of priority of the prior Japanese Patent Application No. 2017-033409, filed on Feb. 24, 2017, the entire contents of which are incorporated herein by reference.

FIELD

The present invention relates to a computing method, an information processing apparatus, a computing program, and an information processing system.

BACKGROUND

In recent years, research has been conducted on a processor including computing elements forming a double torus structure. The computing elements forming a double torus structure are M×N computing elements configured such that M (M is an integer of 1 or more) computing elements arranged in the row direction and N (N is an integer of 1 or more) computing elements arranged in the column direction are connected to each other in a torus-like manner, for example.

In the processor including the computing elements as above, the frequency of accessing a memory (for example, a dynamic random access memory (DRAM)) during processing is reduced by performing the processing while sharing data stored in registers of the computing elements among the plurality of computing elements. As a result, the processor as described above can realize high-speed processing (for example, see Japanese Laid-open Patent Publication No. H06-175986).

SUMMARY

In the processor as described above, when a matrix product is calculated, for example, submatrices of matrices to be calculated are stored in the registers of the plurality of computing elements and the processing is performed by sharing the data stored in each register among the plurality of computing elements. As a result, the processor can realize high-speed processing also for the calculation of the matrix product.

However, in the processor as described above, processing using the same submatrix may be simultaneously performed in a plurality of computing elements. Thus, in that case, in the processor, there may be computing elements that need to wait for the processing in other computing elements to end, and efficient (high-speed) calculation of the matrix product is sometimes not able to be performed.

According to an aspect of the embodiments, a computing method for calculating a product of a first matrix and a second matrix in an information processing apparatus including M×N computing elements configured such that M computing elements arranged in a row direction and N computing elements arranged in a column direction are connected to each other in a torus-like manner, where M is an integer of 1 or more and N is an integer of 1 or more, the computing method includes: first generating, by a processor, one or more first partitioned matrices by partitioning the first matrix by a least common multiple of the M and the N in the row direction and by the N in the column direction; second generating, by a processor, one or more second partitioned matrices by partitioning the second matrix by the M in the row direction and by the least common multiple in the column direction; first storing, by a processor, the one or more generated first partitioned matrices in storage units of the computing elements so that the one or more first partitioned matrices located in the same column in the first matrix are stored in the computing elements arranged in different columns in the information processing apparatus; second storing, by a processor, the one or more generated second partitioned matrices in the storage units so that the one or more second partitioned matrices located in the same row in the second matrix are stored in the computing elements arranged in different rows in the information processing apparatus; first adding, by a processor, a first product of the one or more first partitioned matrices and the one or more second partitioned matrices stored in the storage unit of each of the computing elements, to a first result matrix stored in the storage unit of each of the computing elements, for each of the computing elements; first transmitting, by a processor, for each of the computing elements, the one or more first partitioned matrices stored in the storage unit of each of the computing elements, to computing elements directly connected to that computing element out of other computing elements connected to each other in a torus-like manner in the row direction; second transmitting, by a processor, for each of the computing elements, the one or more second partitioned matrices stored in the storage unit of each of the computing elements, to computing elements directly connected to that computing element out of other computing elements connected to each other in a torus-like manner in the column direction; second adding, by a processor, in response to the reception of the one or more first partitioned matrices and the one or more second partitioned matrices from other computing elements, a second product of the one or more received first partitioned matrices and the one or more received one or more second partitioned matrices, to the first result matrix stored in the storage unit of each of the computing elements, for each of the computing elements; and first repeating, by a processor, the first transmitting, the second transmitting and the second adding, until the product calculated from the one or more first partitioned matrices stored in the storage unit of each of the computing elements is added to the first result matrix in each of the computing elements connected to each other in a torus-like manner, and the product calculated from the one or more second partitioned matrices stored in the storage unit of each of the computing elements is added to the first result matrix in each of the computing elements connected to each other in a torus-like manner.

According to one aspect, the matrix product can be efficiently calculated.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a diagram illustrating the specific examples of the processing in Step S4 and Step S5.

FIG. 10 is a diagram illustrating the specific examples of the processing in Step S4 and Step S5.

FIG. 11 is a diagram illustrating the specific examples of the processing in Step S4 and Step S5.

FIG. 19 is a diagram illustrating the details of the matrix computing processing in the first embodiment.

FIG. 20 is a diagram illustrating the details of the matrix computing processing in the first embodiment.

FIG. 29 is a diagram illustrating the details of the matrix computing processing in the first embodiment.

DESCRIPTION OF EMBODIMENTS

Configuration of Information Processing System

Figure 1:
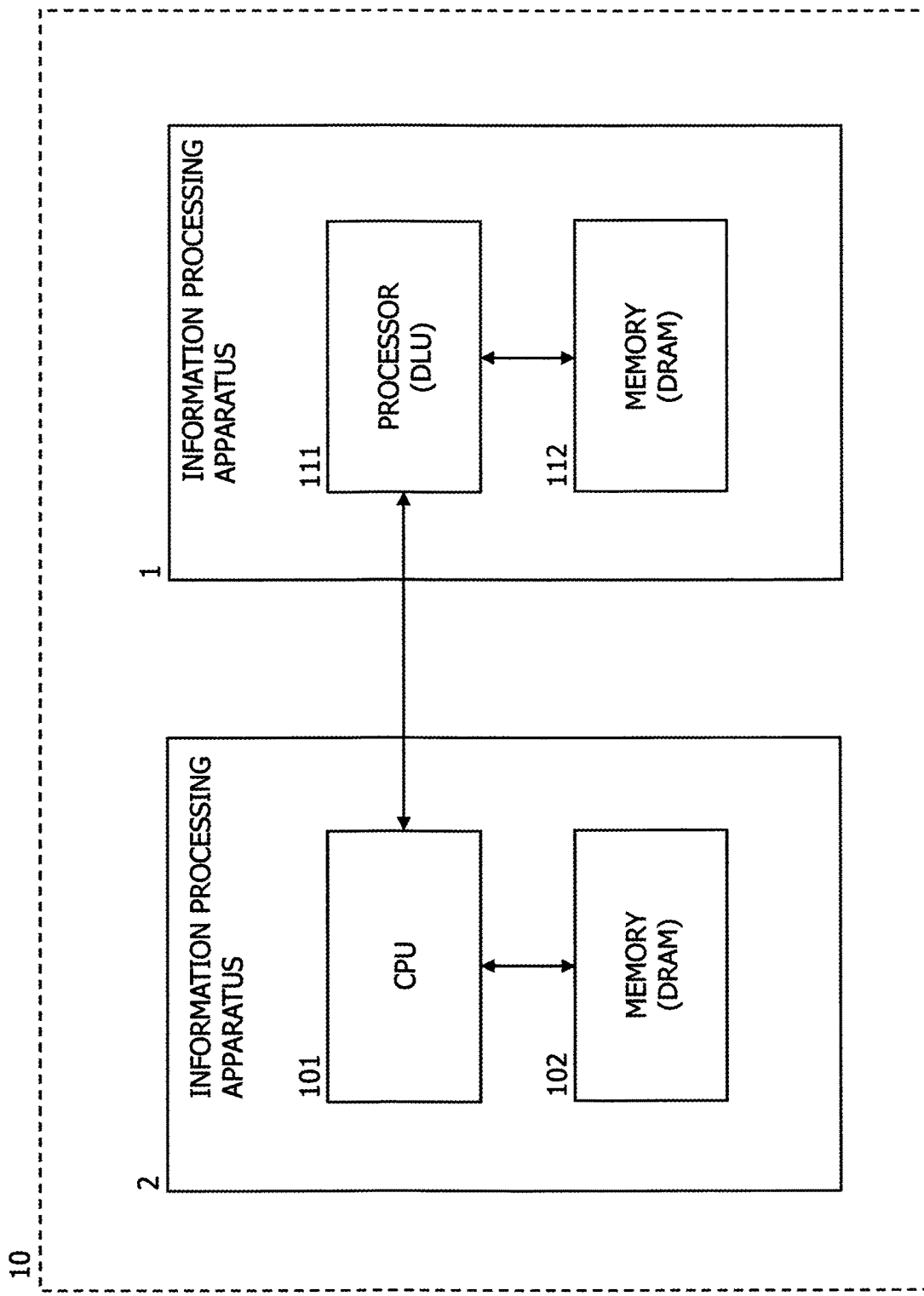
FIG. 1 is a diagram illustrating the configuration of the information processing system 10.

First, the configuration of an information processing system 10 is described. FIG. 1 is a diagram illustrating the configuration of the information processing system 10. The information processing system 10 illustrated in FIG. 1 includes an information processing apparatus 1 and an information processing apparatus 2. The information processing apparatus 1 includes a processor 111 and a memory 112, and the information processing apparatus 2 includes a CPU 101 and a memory 102. The processor 111 is described below as a DLU® manufactured by Fujitsu Limited.

When a researcher of the processor (hereinafter also simply referred to as "researcher") inputs matrices to the information processing apparatus 2, for example, the CPU 101 stores the input matrices into the memory 102. When the matrix product is to be calculated in the DLU 111, for example, the CPU 101 stores the matrices stored in the memory 102 into the memory 112.

The DLU 111 is a processor including M×N computing elements (hereinafter also referred to as "DPUs") forming a double torus structure. The DLU 111 acquires the matrices (hereinafter also referred to as "first matrix" and "second matrix") stored in the memory 112 and calculates the product of the first matrix and the second matrix at a predetermined timing (for example, when an input for calculating the matrix product is input to the information processing apparatus 1).

Figure 2:
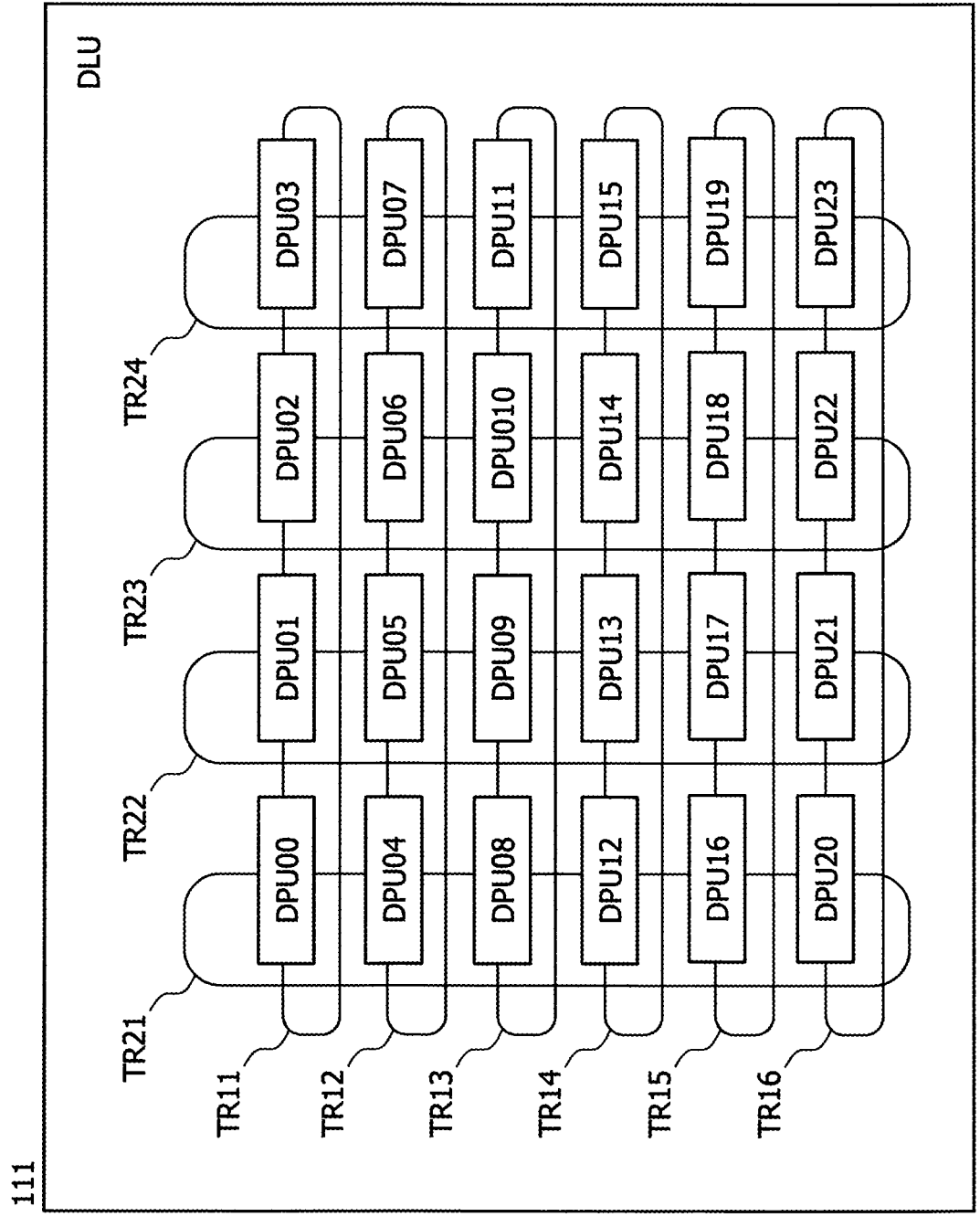
FIG. 2 is a diagram illustrating the configuration of the DLU 111.

Next, the configuration of the DLU 111 is described. FIG. 2 is a diagram illustrating the configuration of the DLU 111.

As illustrated in FIG. 2, for example, the DLU 111 includes 24 DPUs formed of six DPUs arranged in the column direction (the vertical direction in FIG. 2) and four DPUs arranged in the row direction (the horizontal direction in FIG. 2). Each DPU includes a storage unit configured to store the submatrices of the first matrix and the second matrix, for example.

As illustrated in FIG. 2, six DPUs arranged in the same column (a DPU 00, a DPU 04, a DPU 08, a DPU 12, a DPU 16, and a DPU 20) form a torus structure TR21. Specifically, for example, the DPU 00 is connected to the DPU 20 and the DPU 04, and the DPU 04 is connected to the DPU 00 and the DPU 08.

As illustrated in FIG. 2, four DPUs arranged in the same row (the DPU 00, a DPU 01, a DPU 02, and a DPU 03) form a torus structure TR11. Specifically, for example, the DPU 00 is connected to the DPU 03 and the DPU 01, and the DPU 01 is connected to the DPU 00 and the DPU 02.

That is, the 24 DPUs arranged in the DLU 111 form a double torus structure including four torus structures (TR21, TR22, TR23, and TR24) each formed of six DPUs arranged in the same column and six torus structures (TR11, TR12, TR13, TR14, TR15, and TR16) each formed of four DPUs arranged in the same row.

As a result, for example, the DPU 00 can share (refer to) the submatrices stored in other DPUs forming the torus structure TR21, that is, the DPU 04, the DPU 08, the DPU 12, the DPU 16, and the DPU 20. The DPU 00 can share (refer to) the submatrices stored in the other DPUs forming the torus structure TR11, that is, the DPU 01, the DPU 02, and the DPU 03.

Thus, when the product of the first matrix and the second matrix is calculated, for example, the DLU 111 can reduce the frequency of accessing the memory 112 during the calculation of the product of the first matrix and the second matrix by storing the submatrices that need to be multiplied by and added to the submatrices stored in the DPU 00, the DPU 01, the DPU 02, and the DPU 03, in any one of the DPU 00, the DPU 04, the DPU 08, the DPU 12, the DPU 16, and the DPU 20. A case in the submatrices of the first matrix and the second matrix are stored in any one of the DPU 00 to a DPU 23 is described below.

Storage of Submatrices in Each DPU

Figure 3:
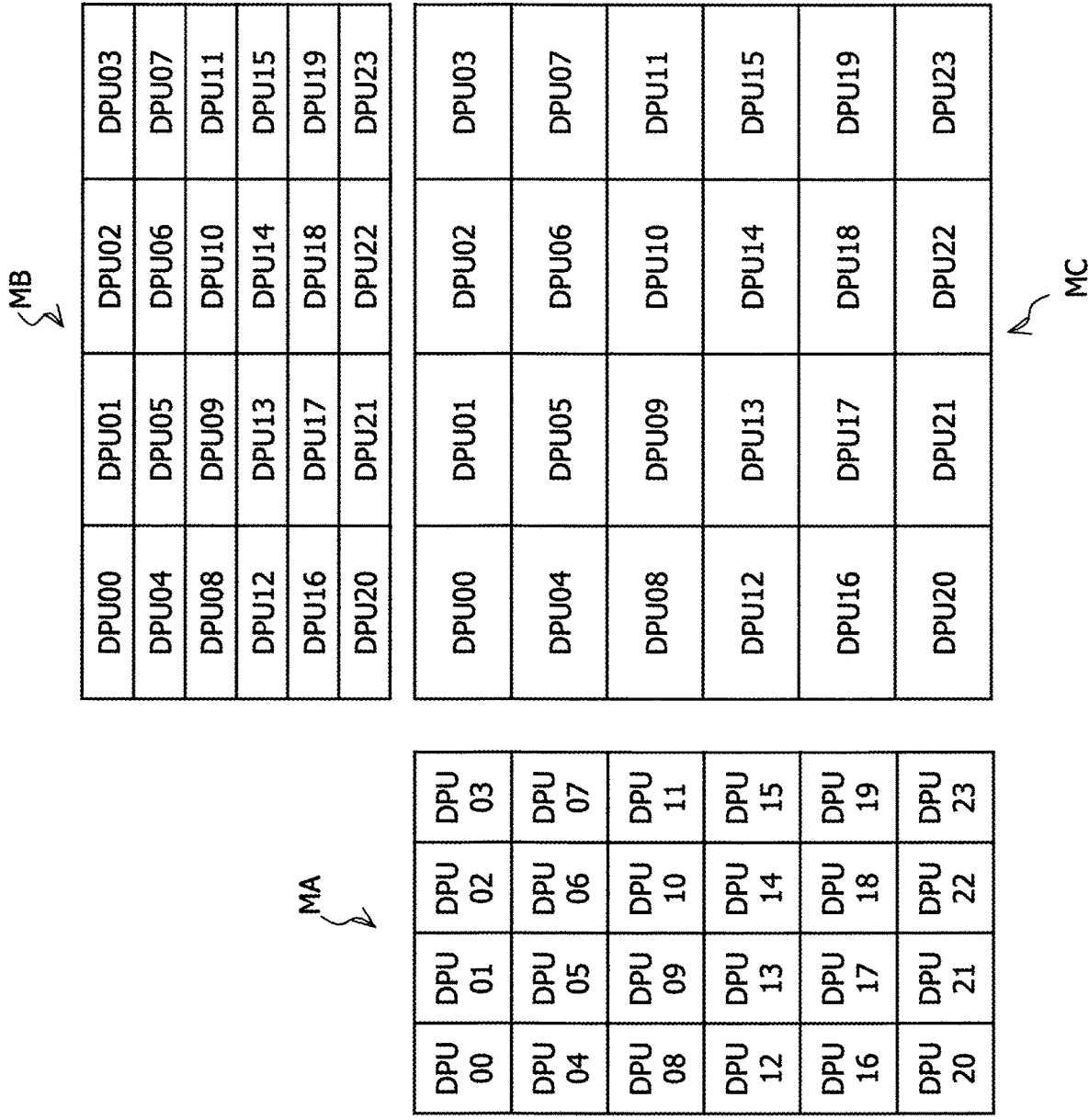
FIG. 3 is a diagram illustrating the storage of the submatrices in the DPU 00 to the DPU 23.

FIG. 3 is a diagram illustrating the storage of the submatrices in the DPU 00 to the DPU 23. Specifically, FIG. 3 is a diagram illustrating the storage of the submatrices when the product of a first matrix MA and a second matrix MB is calculated. The calculation result of the product of the first matrix MA and the second matrix MB is described below as a third matrix MC.

As illustrated in FIG. 3, the DLU 111 partitions each of the first matrix MA and the second matrix MB is into 24 parts, for example. Specifically, as illustrated in FIG. 3, the DLU 111 partitions each of the first matrix MA and the second matrix MB into six parts in the column direction and four parts in the row direction in accordance with the arrangement of each DPU in the DLU 111.

Then, the DLU 111 stores the submatrices of the first matrix MA in the DPUs so that the submatrix of the first matrix MA to be used as when the submatrix of the third matrix MC is calculated is stored in any one of the DPUs forming a torus structure. The DLU 111 stores the submatrices of the second matrix MB so that the submatrix of the second matrix MB to be used as when the submatrix of the third matrix MC is calculated is stored in any one of the DPUs forming a torus structure. The DLU 111 determines the DPU in which the submatrix of the third matrix MC is to be stored as the DPU in which both of the submatrix of the first matrix MA and the submatrix of the second matrix MB to be used in the calculation of that submatrix are to be stored. That is, the DLU 111 stores the submatrices of the first matrix MA, the second matrix MB, and the third matrix MC into each of the DPU 00 to the DPU 23.

Specifically, the DLU 111 stores a submatrix of the first matrix MA to be used in the calculation of a predetermined submatrix out of the submatrices of the third matrix MC in any one of the DPU 00, the DPU 01, the DPU 02, and the DPU 03, for example. The DLU 111 stores a submatrix of the second matrix MB to be used in the calculation of a predetermined submatrix out of the submatrices of the third matrix MC in any one of the DPU 00, the DPU 04, the DPU 08, the DPU 12, the DPU 16, and DPU 20, for example. In that case, the DLU 111 stores the predetermined submatrix out of the submatrices of the third matrix MC in the DPU 00 that is common to the DPU storing the submatrix of the first matrix MA therein and the DPU storing the submatrix of the second matrix MB therein.

As a result, the DLU 111 does not need to access the memory 112 when the submatrix of the third matrix MC is calculated.

Specific Example of Storage of Submatrices into DPUs

Figure 4:
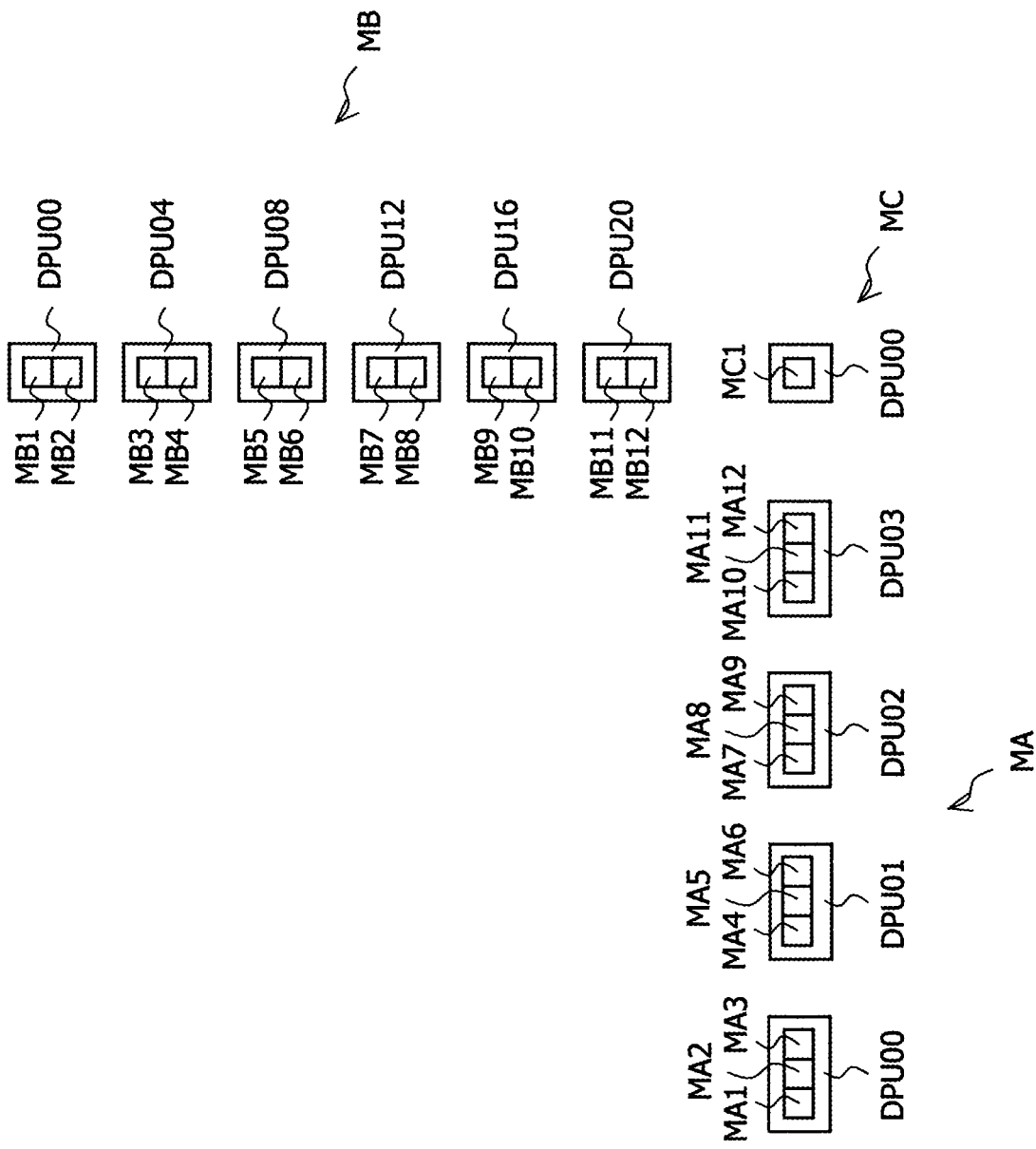
FIG. 4 is a diagram illustrating a specific example of the storage of the submatrices into the DPU 00 to the DPU 23.

Next, a specific example of the storage of the submatrices into the DPU 00 to the DPU 23 is described. FIG. 4 is a diagram illustrating a specific example of the storage of the submatrices into the DPU 00 to the DPU 23. In FIG. 4, only the submatrices to be stored in the DPU 00, the DPU 01, the DPU 02, and the DPU 03 out of the first matrix MA, the submatrices to be stored in the DPU 00, the DPU 04, the DPU 08, the DPU 12, the DPU 16, and the DPU 20 out of the second matrix MB, and the submatrix to be stored in the DPU 00 out of the third matrix MC are illustrated. In the example illustrated in FIG. 4, symbols MA1 to MA12 and MB1 to MB12 are matrices (hereinafter also referred to as "partitioned matrices") partitioned from the first matrix MA and the second matrix MB. An initial value of each component of the third matrix MC is zero.

When the DLU 111 stores the submatrices in the DPUs, it is preferred that the submatrices be stored in the DPUs as equally as possible so that the matrix product is efficiently calculated. Thus, the DLU 111 generates one or more partitioned matrices by partitioning the first matrix MA by the least common multiple of M (the number of the DPUs arranged in the row direction) and N (the number of the DPUs arranged in the column direction) in the row direction and by N in the column direction, for example. The DLU 111 stores the one or more generated partitioned matrices in the DPUs for every submatrix of which number of the partitioned matrices in the row direction is a number obtained by dividing the least common multiple by M and of which number of the partitioned matrices in the column direction is 1. The DLU 111 generates one or more partitioned matrices by partitioning the second matrix MB by M in the row direction and by the least common multiple of M and N in the column direction, for example. The DLU 111 stores the one or more generated partitioned matrices in the DPUs for every submatrix in which the number of the partitioned matrices in the row direction is 1 and the number of the partitioned matrices in the column direction is a number obtained by dividing the least common multiple by N.

Specifically, in the example illustrated in FIG. 2, the number of the DPUs arranged in the row direction is four, and the number of the DPUs arranged in the column direction is six. Thus, in that case, the DLU 111 partitions each of the row direction of the first matrix MA and the column direction of the second matrix MB by 12 that is the least common multiple of the number of the DPUs arranged in the row direction and the number of the DPUs arranged in the column direction as illustrated in FIG. 4. As illustrated in FIG. 4, the DLU 111 stores the submatrices in which the number of the partitioned matrices in the row direction is three in the DPU 00, the DPU 01, the DPU 02, and the DPU 03, and stores the submatrices in which the number of the partitioned matrices in the column direction is two in the DPU 00, the DPU 04, the DPU 08, the DPU 12, the DPU 16, and the DPU 20.

As a result, the DLU 111 can store the submatrices for the DPUs as equally as possible.

Calculation of Product of First Matrix and Second Matrix

Next, the calculation of the product (third matrix MC) of the first matrix MA and the second matrix MB is described.

In the example illustrated in FIG. 4, the DPU 00 circulates the partitioned matrices stored in the DPUs between the DPU 01, the DPU 02, and the DPU 03 forming a torus structure. The DPU 00 circulates the partitioned matrices stored in the DPUs between the DPU 04, the DPU 08, the DPU 12, the DPU 16, and the DPU 20 forming a torus structure. The DPU 00 calculates the submatrix stored in the DPU 00 out of the third matrix MC.

Specifically, in the example illustrated in FIG. 4, the DPU 00 adds the product of the partitioned matrix MA1 and the partitioned matrix MB1 and the product of the partitioned matrix MA2 and the partitioned matrix MB2 together, and stores the sum of the calculated matrix and the present partitioned matrix MC1 as the new partitioned matrix MC1. Then, in the example illustrated in FIG. 4, the DPU 00 adds the product of the partitioned matrix MA3 and the partitioned matrix MB3 (the partitioned matrix transmitted to the DPU 00 from the DPU 04 by the circulation of the partitioned matrices) together, and stores the sum of the calculated matrix and the present partitioned matrix MC1 as the new partitioned matrix MC1. In the example illustrated in FIG. 4, the DPU 00 adds the product of the partitioned matrix MA4 (the partitioned matrix transmitted to the DPU 00 from the DPU 01 by the circulation of the partitioned matrices) and the partitioned matrix MB4 (the partitioned matrix transmitted to the DPU 00 from the DPU 04 by the circulation of the partitioned matrices), and stores the sum of the calculated matrix and the present partitioned matrix MC1 as the new partitioned matrix MC1. Similarly, the DPU 00 performs multiplication and addition of the partitioned matrices MA1 to MA12 and MB1 to MB12, and calculates the partitioned matrix MC1.

In that case, the DLU 111 parallelly performs the calculation of the product of the submatrix of the first matrix MA and the submatrix of the second matrix MB also in the DPUs other than the DPU 00. As a result, the DLU 111 can realize high-speed processing when the matrix product is calculated.

However, in the DLU 111, processing (computing) using the same submatrix may be simultaneously performed in a plurality of DPUs. Specifically, in the example illustrated in FIG. 3, the abovementioned case corresponds to a case in which the submatrix stored in the DPU 00 out of the first matrix MA is simultaneously used in the calculation of the submatrix to be stored in the DPU 00 of the third matrix MC and the calculation of the submatrix to be stored in the DPU 01 of the third matrix MC.

In that case, in the DLU 111, there are DPUs that need to wait for the processing in the other DPUs to end, and it is not possible to calculate the matrix product efficiently (at high-speed).

Thus, as illustrated in FIG. 4, the DLU 111 in this embodiment generates one or more partitioned matrices (hereinafter also referred to as "first partitioned matrices") by partitioning the first matrix MA by the least common multiple of M (the number of the DPUs arranged in the row direction) and N (the number of the DPUs arranged in the row direction) in the row direction of the first matrix and by N in the column direction of the first matrix MA. As illustrated in FIG. 4, the DLU 111 generates one or more partitioned matrices (hereinafter also referred to as "second partitioned matrices") by partitioning the second matrix MB by M in the row direction of the second matrix and by the least common multiple of M and N in the column direction of the second matrix.

The DLU 111 stores one or more first partitioned matrices in the storage units of the DPUs so that one or more first partitioned matrices located in the same column in the first matrix MA are stored in DPUs arranged in different columns in the DLU 111. The DLU 111 stores one or more second partitioned matrices in the storage units of the DPUs so that one or more second partitioned matrices located in the same row in the second matrix MA are stored in the DPUs arranged in different rows in the DLU 111.

That is, the DLU 111 determines the DPUs in which the submatrices are to be stored so that the timings at which a plurality of DPUs use the same submatrix do not overlap each other. As a result, the DLU 111 can suppress the occurrence of waiting time for each DPU.

For each DPU, the DLU 111 adds the product (hereinafter also referred to as "first product") of one or more first partitioned matrices and one or more second partitioned matrices stored in the storage unit to the submatrix (hereinafter also referred to as "first result matrix") of the third matrix stored in the storage unit. Then, for each DPU, the DLU 111 transmits the first partitioned matrices stored in the storage unit to DPUs directly connected to that DPU out of the other DPUs connected to each other in a torus-like manner in the row direction. Further, for each DPU, the DLU 111 transmits one or more second partitioned matrices stored in the storage unit to DPUs directly connected to that DPU out of the other DPUs connected to each other in a torus-like manner in the column direction.

Then, in response to the reception of one or more first partitioned matrices and one or more second partitioned matrices from the other DPUs, the DLU 111 adds the product (hereinafter also referred to as "second product") of the one or more received first partitioned matrices and the one or more received second partitioned matrices to the first result matrix stored in the storage unit for each DPU.

Then, the DLU 111 repeats transmitting the first partitioned matrices, transmitting the second partitioned matrices, and adding the second product, until the product calculated from the one or more first partitioned matrices stored in the storage unit of each DPU is added to the first result matrix in each of the DPUs connected to each other in a torus-like manner and the product calculated from the one or more second partitioned matrices stored in the storage unit of each DPU is added to the first result matrix in each of the DPUs connected to each other in a torus-like manner.

As a result, the DLU 111 can calculate the product of the first matrix MA and the second matrix MB efficiently (at high-speed).

Figure 5:
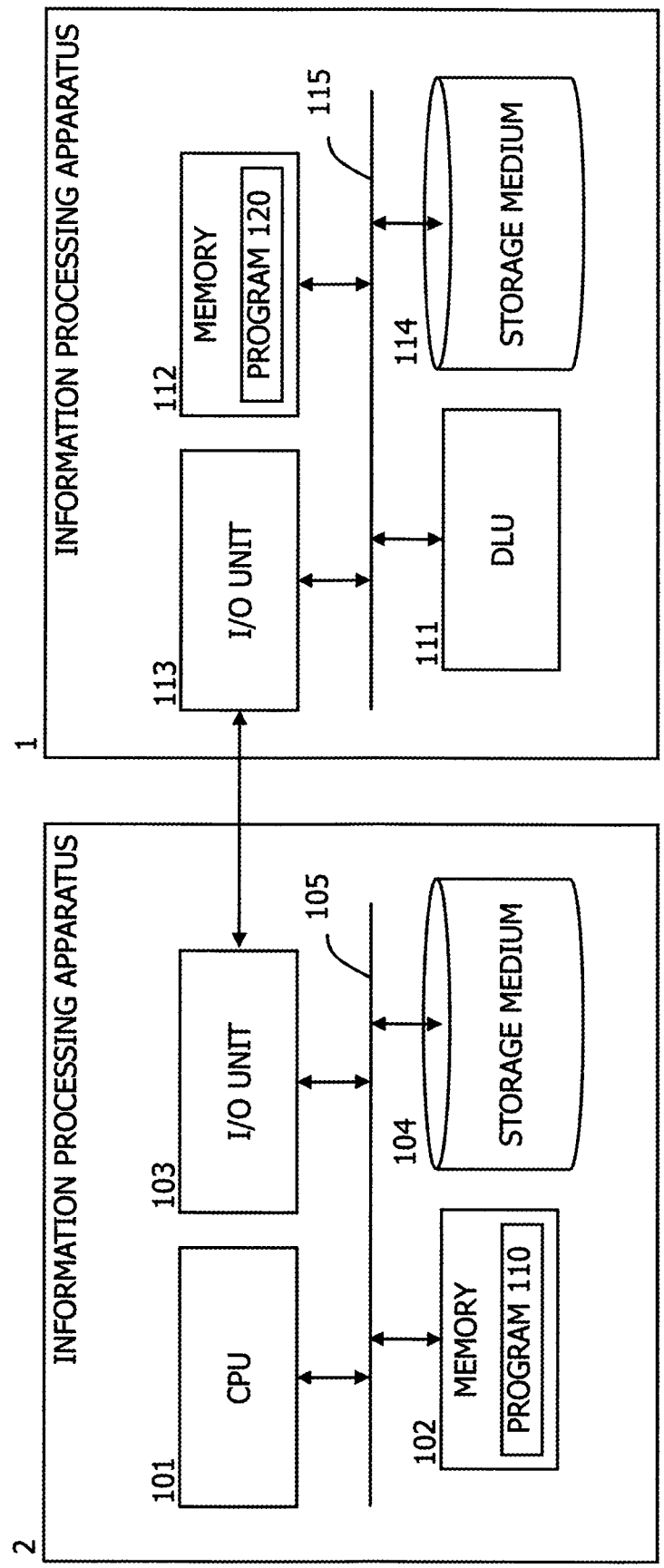
FIG. 5 is a diagram illustrating the hardware configuration of the information processing system 10.

Hardware Configuration of Information Processing System Next, the hardware configuration of the information processing system 10 is described. FIG. 5 is a diagram illustrating the hardware configuration of the information processing system 10.

The information processing apparatus 1 includes the DLU 111 that is a processor, the memory 112, an external interface (I/O unit) 113, and a storage medium (storage) 114. The units are connected to each other via a bus 115.

The storage medium 114 stores a program 120 for performing processing (hereinafter also referred to as "matrix computing processing") of calculating the product of the first matrix MA and the second matrix MB in a program storage area (not illustrated) in the storage medium 114.

When the program 120 is executed, the DLU 111 loads the program 120 to the memory 112 from the storage medium 114 and performs the matrix computing processing in cooperation with the program 120. The external interface 113 communicates with the information processing apparatus 2.

The information processing apparatus 2 includes the CPU 101 that is a processor, the memory 102, an external interface (I/O unit) 103, and a storage medium (storage) 104. The units are connected to each other via a bus 105.

The storage medium 104 stores a program 110 for performing processing (hereinafter also referred to as "matrix storage processing") for storing the first matrix MA and the second matrix MB stored in the memory 102 in the memory 112 in a program storage area (not illustrated) in the storage medium 104.

As illustrated in FIG. 5, when the program 110 is executed, the CPU 101 loads the program 110 to the memory 112 from the storage medium 104 and performs the matrix storage processing in cooperation with the program 110. The external interface 103 communicates with the information processing apparatus 1.

Function of DLU

Figure 6:
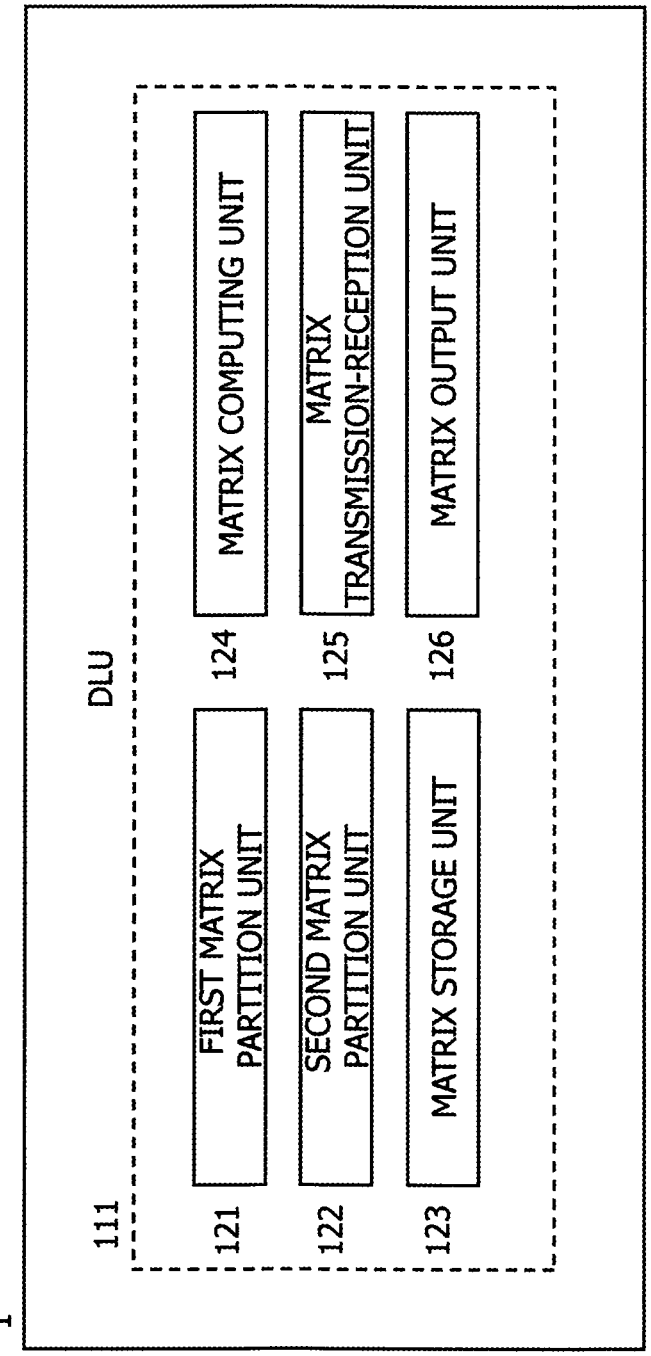
FIG. 6 is a functional block diagram of the DLU 111.

Next, a functional block diagram of the DLU 111 is described. FIG. 6 is a functional block diagram of the DLU 111. As illustrated in FIG. 6, the DLU 111 operates as a first matrix partition unit 121, a second matrix partition unit 122, a matrix storage unit 123, a matrix computing unit 124, a matrix transmission-reception unit 125, and a matrix output unit 126 by cooperating with the program 120.

The first matrix partition unit 121 generates one or more first partitioned matrices by partitioning the first matrix MA by the least common multiple of M and N in the row direction and by N in the column direction, for example.

The second matrix partition unit 122 generates one or more second partitioned matrices by partitioning the second matrix MB by M in the row direction and by the least common multiple of M and N in the column direction, for example.

The matrix storage unit 123 stores one or more first partitioned matrices generated by the first matrix partition unit 121 in the storage units of the DPUs so that one or more first partitioned matrices located in the same column in the first matrix MA are stored in the DPUs arranged in different columns in the DLU 111, for example. The matrix storage unit 123 stores one or more second partitioned matrices generated by the second matrix partition unit 122 in the storage units of the DPUs so that one or more second partitioned matrices located in the same row in the second matrix MB are stored in the DPUs arranged in different rows in the DLU 111, for example.

For each DPU, the matrix computing unit 124 adds the first product of one or more first partitioned matrices and one or more second partitioned matrices stored in the storage unit to the first result matrix stored in the storage unit, for example.

For each DPU, the matrix transmission-reception unit 125 transmits one or more first partitioned matrices stored in the storage unit to DPUs directly connected to that DPU out of the other DPUs connected to each other in a torus-like manner in the row direction, for example. For each DPU, the matrix transmission-reception unit 125 transmits one or more second partitioned matrices stored in the storage unit to DPUs directly connected to that DPU out of the other DPUs connected to each other in a torus-like manner in the column direction, for example. Then, in response to the matrix transmission-reception unit 125 receiving one or more first partitioned matrices and one or more second partitioned matrices from the other DPUs, the matrix computing unit 124 adds the second product of the one or more received first partitioned matrices and the one or more received second partitioned matrices to the first result matrix stored in the storage unit for each DPU, for example.

The matrix transmission-reception unit 125 and the matrix computing unit 124 repeats the transmission of the partitioned matrices and the addition of the second product, until each step is performed in all the DPUs connected to each other in a torus-like manner.

The matrix output unit 126 outputs the first result matrix to the information processing apparatus 2 and the like after the transmission of the partitioned matrices and the addition of the second product are performed in all the DPUs connected to each other in a torus-like manner.

Outline of First Embodiment

Figure 7:
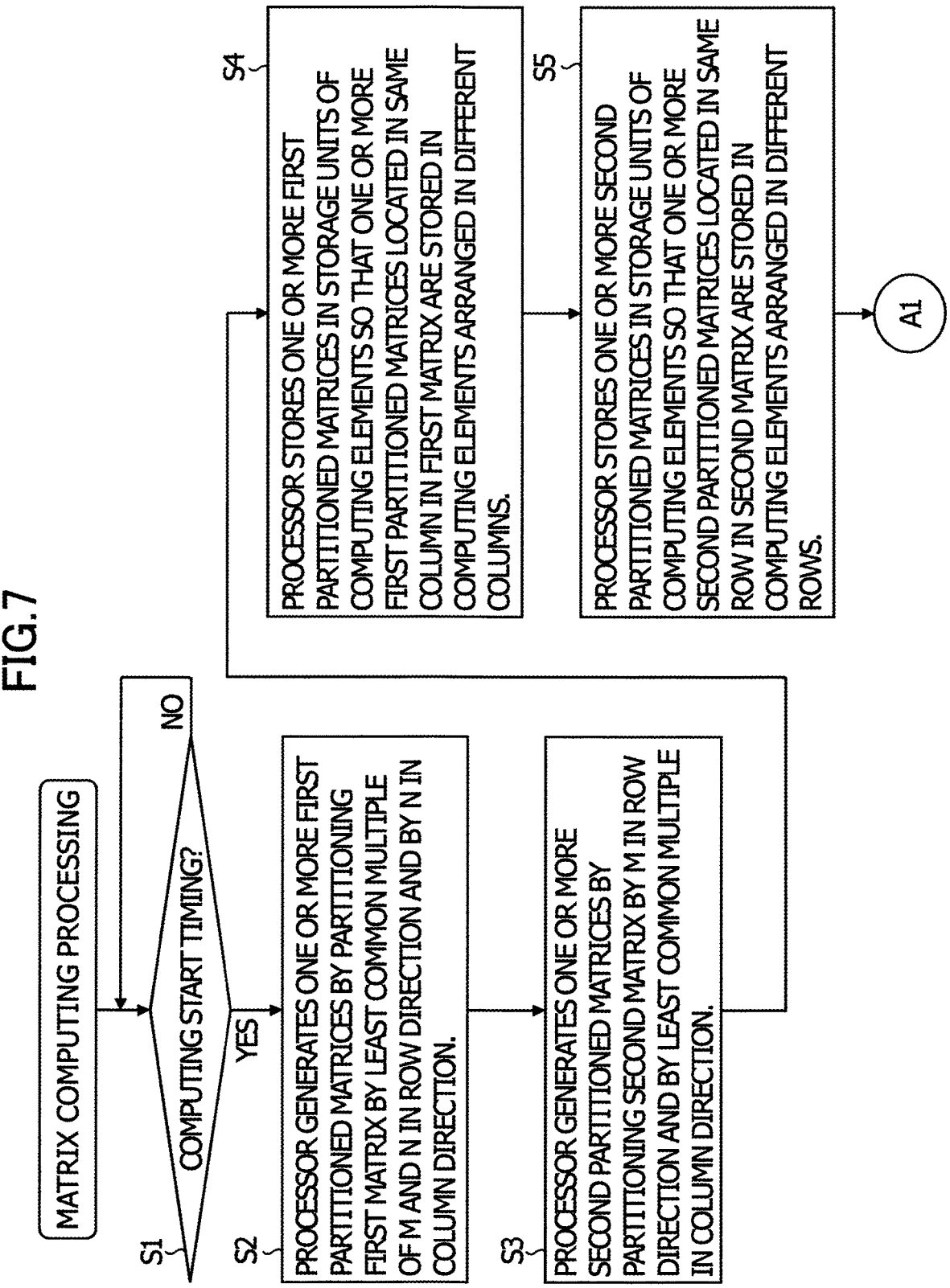
FIG. 7 is a flowchart illustrating the outline of the matrix computing processing in the first embodiment.
Figure 8:
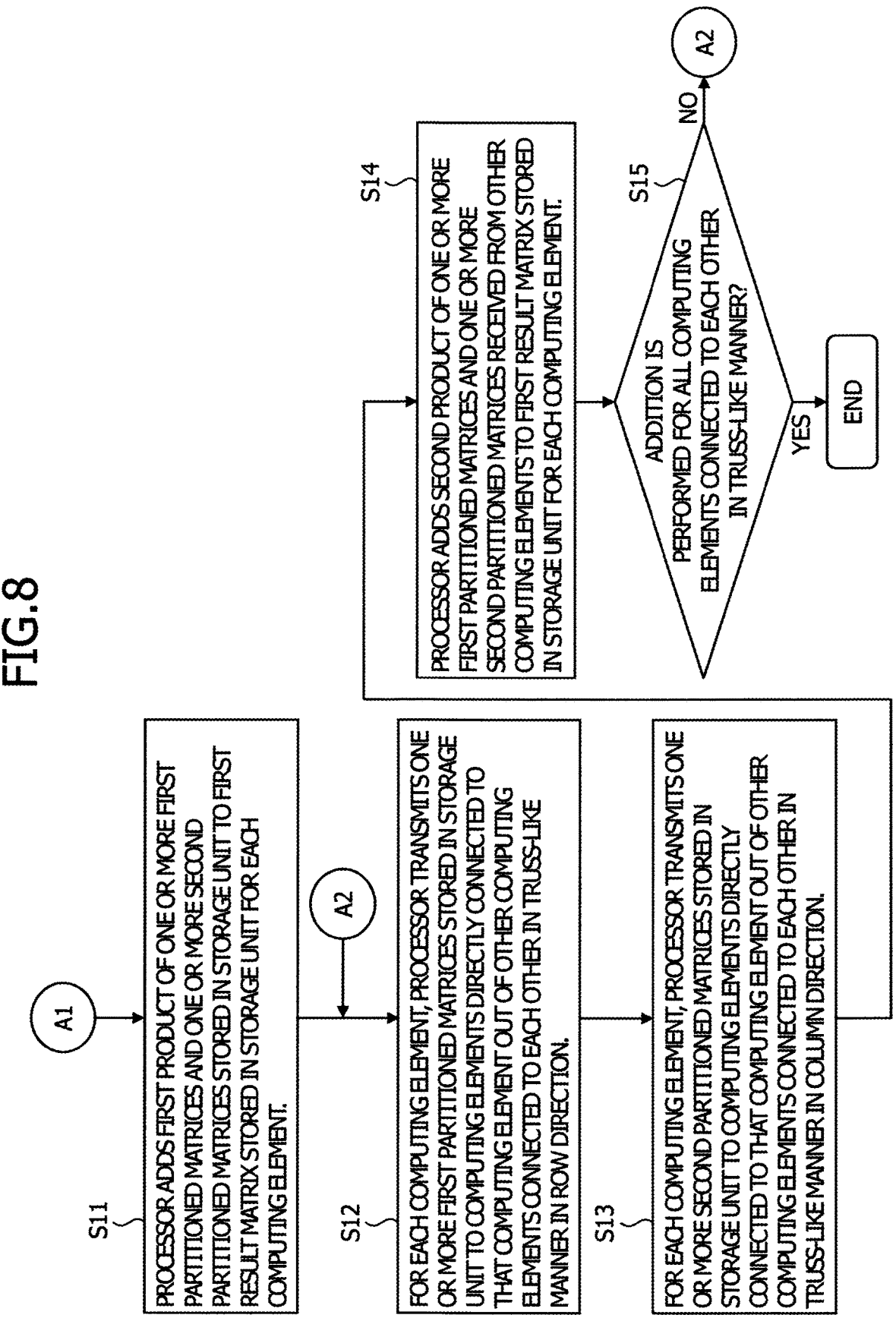
FIG. 8 is a flowchart illustrating the outline of the matrix computing processing in the first embodiment.

Next, the outline of the first embodiment is described. FIG. 7 and FIG. 8 are flowcharts illustrating the outline of the matrix computing processing in the first embodiment.

As illustrated in FIG. 7, the DLU 111 waits until a computing start timing (NO in Step S1). The computing start timing may be a timing at which the researcher inputs an input for starting the calculation of the product of the first matrix MA and the second matrix MB to the information processing apparatus 1, for example.

When the computing start timing comes (YES in Step S1), the DLU 111 generates one or more first partitioned matrices by partitioning the first matrix MA by the least common multiple of M and N in the row direction and by N in the column direction, for example (S2). The DLU 111 generates one or more second partitioned matrices by partitioning the second matrix MB by M in the row direction and by the least common multiple of M and N in the column direction, for example (S3).

Then, the DLU 111 stores one or more first partitioned matrices in the storage units of the DPUs so that one or more first partitioned matrices located in the same column in the first matrix MA are stored in the DPUs arranged in different columns in the DLU 111, for example (S4). The DLU 111 stores one or more second partitioned matrices in the storage units of the DPUs so that one or more second partitioned matrices located in the same row in the second matrix MB are stored in the DPUs arranged in different rows in the DLU 111, for example (S5).

As illustrated in FIG. 8, the DLU 111 adds the first product of one or more first partitioned matrices and one or more second partitioned matrices stored in the storage unit to the first result matrix stored in the storage unit for each DPU, for example (S11).

Then, for each DPU, the DLU 111 transmits one or more first partitioned matrices stored in the storage unit to DPUs directly connected to that DPU out of the other DPUs connected to each other in a torus-like manner in the row direction for example (S12). For each DPU, the DLU 111 transmits one or more second partitioned matrices stored in the storage unit to DPUs directly connected to that DPU out of the other DPUs connected to each other in a torus-like manner in the column direction, for example (S13).

In response to the reception of one or more first partitioned matrices and one or more second partitioned matrices from other DPUs, the DLU 111 adds the second product of the one or more received first partitioned matrices and the one or more received second partitioned matrices to the first result matrix stored in the storage unit for each DPU, for example (S14).

Then, the DLU 111 determines whether the product calculated from the one or more first partitioned matrices stored in the storage unit of each DPU is added to the first result matrix of each of the DPUs connected to each other in a torus-like manner, and whether the product calculated from the one or more second partitioned matrices stored in the storage unit of each DPU is added to the first result matrix of each of the DPUs connected to each other in a torus-like manner (S15). As a result, when it is determined that the product is added to the first result matrix of each of the DPUs connected to each other in a torus-like manner (YES in Step S15), the DLU 111 ends the matrix computing processing. When it is determined that the product is not added to the first result matrix of each of the DPUs connected to each other in a torus-like manner (NO in Step S15), the DLU 111 performs the processing in Step S12 and the subsequent steps.

That is, the DLU 111 determines the DPUs for holding the submatrices so that the timings at which a plurality of DPUs use the same submatrix do not overlap each other.

As a result, the DLU 111 can suppress the occurrence of waiting time in each DPU. Thus, the DLU 111 can calculate the product of the first matrix MA and the second matrix MB efficiently (at high-speed).

Specific Examples of Processing in Step S4 and Step S5

Figure 9:
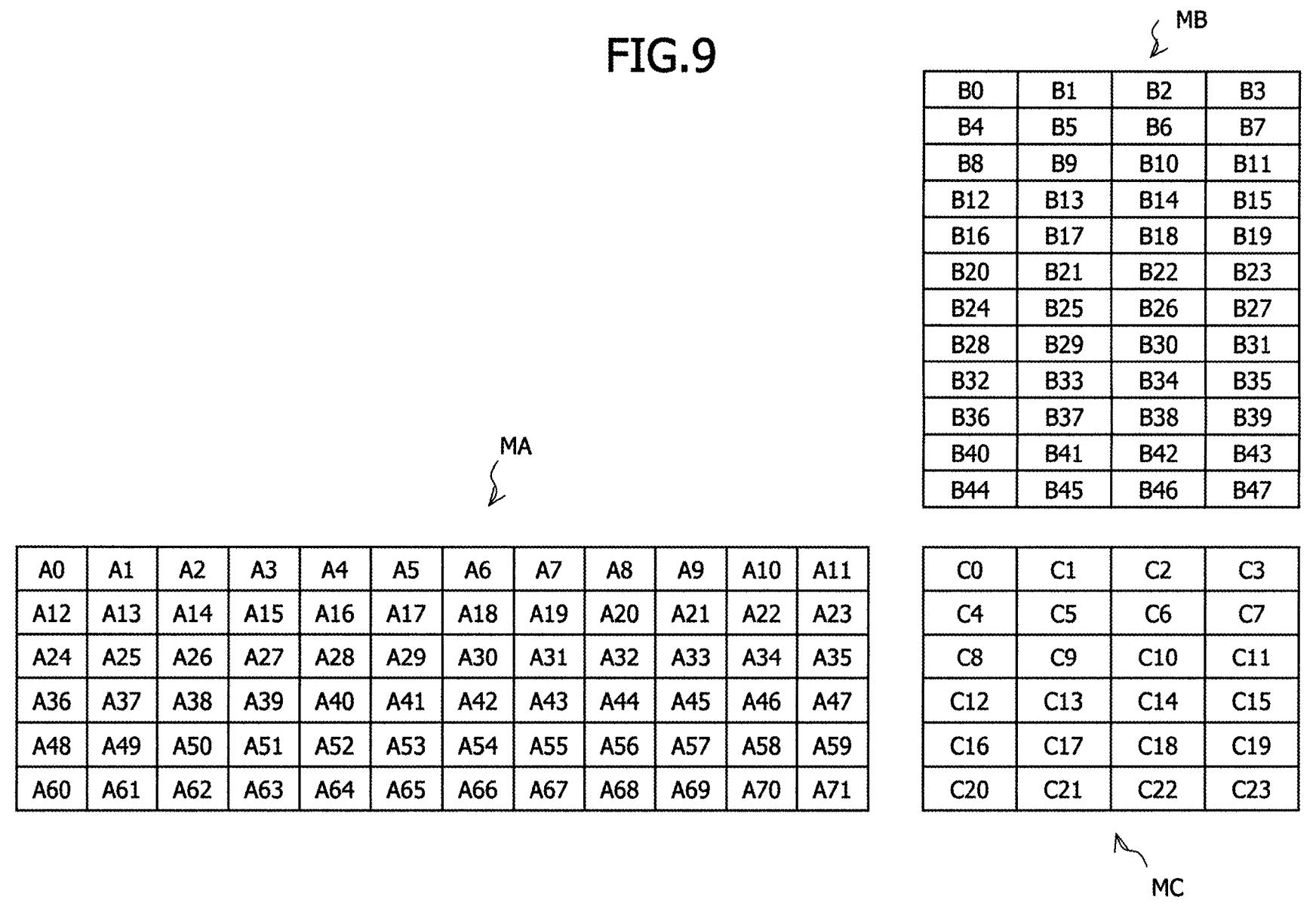

Next, the specific examples of the processing in Step S4 and Step S5 are described. FIG. 9 to FIG. 11 are diagrams illustrating the specific examples of the processing in Step S4 and Step S5. In the examples illustrated in FIG. 9 to FIG. 11, the first matrix MA, the second matrix MB, and the third matrix MC respectively correspond to the first matrix MA, the second matrix MB, and the third matrix MC described in FIG. 3 and FIG. 4. In the example illustrated in FIG. 9, symbols A0 and the like in the first matrix MA indicate the partitioned matrices (first partitioned matrices) generated in the processing in Step S2, and symbols B0 and the like in the second matrix MB indicate the partitioned matrices (second partitioned matrices) generated in the processing in Step S3. In the example illustrated in FIG. 9, symbols C0 and the like in the third matrix MC indicate the submatrices to be stored in the DPUs.

In the example illustrated in FIG. 9, a submatrix in which the number of the partitioned matrices in the row direction is one and the number of the partitioned matrices in the column direction is three are stored in each DPU in accordance with the locations of the partitioned matrices in the first matrix MA. In the example illustrated in FIG. 9, a submatrix in which the number of the partitioned matrices in the row direction is two and the number of the partitioned matrices in the column direction is one is stored in each DPU in accordance with the locations of the partitioned matrices in the second matrix MB. Thus, for example, a submatrix including partitioned matrices A0, A1, and A2, a submatrix including partitioned matrices B0 and B4, and a submatrix C0 are stored in the DPU 00. For example, a submatrix including partitioned matrices A3, A4, and A5, a submatrix including partitioned matrices B1 and B5, and a submatrix C1 are stored in the DPU 01. For example, a submatrix including partitioned matrices A12, A13, and A14, a submatrix including partitioned matrices B8 and B12, and the submatrix C0 are stored in the DPU 04.

Specifically, in the example illustrated in FIG. 9, the submatrix C0 is calculated by multiplying and adding partitioned matrices A0, A1, A2, A3, A4, A5, A6, A7, A8, A9, A10, and A11 and partitioned matrices B0, B4, B8, B12, B16, B20, B24, B28, B32, B36, B40, and B44 together. In the example illustrated in FIG. 9, a submatrix C4 is calculated by multiplying and adding partitioned matrices A12, A13, A14, A15, A16, A17, A18, A19, A20, A21, A22, and A23 and the partitioned matrices B0, B4, B8, B12, B16, B20, B24, B28, B32, B36, B40, and B44 together.

That is, when the partitioned matrices are stored in the DPUs as illustrated in FIG. 9, the DPU 00 and the DPU 04 use the partitioned matrices B0, B4, B8, B12, B16, B20, B24, B28, B32, B36, B40, and B44 in the same order in the calculation of the submatrix C0 and the submatrix C4, respectively, for example. Thus, in that case, waiting time for the processing of the DPU 04 can occur when the submatrix C0 is calculated in the DPU 00. Similarly, in that case, waiting time for the processing of the DPU 00 can occur when the submatrix C4 is calculated in the DPU 04.

Thus, the DLU 111 changes the arrangement of the partitioned matrix of which location is y-th from the top and x-th from the left (hereinafter also referred to as "A[y][x]") out of the partitioned matrices of the first matrix MA illustrated in FIG. 9 in accordance with Expression 1 below (S4). Note that, L in Expression 1 below is a constant indicating the least common multiple of M (the number of the DPUs arranged in the row direction in DLU 111) and N (the number of the DPUs arranged in the row direction in the DLU 111).

$$A[y][(x+y*(L/N))\% L] \tag{1}$$

Specifically, as illustrated in FIG. 10, the DLU 111 rearranges the partitioned matrices A12, A13, A14, A15, A16, A17, A18, A19, A20, A21, A22, and A23 into the order of the partitioned matrices A22, A23, A12, A13, A14, A15, A16, A17, A18, A19, A20, and A21, and then stores the rearranged partitioned matrices in the DPUs, for example (S4).

That is, the DLU 111 uses "2" that is calculated by dividing "12" that is the number of the columns in the first matrix MA by "6" that is the number of the rows in the first matrix MA as the number of the partitioned matrices to be moved in each row, for example. Thus, as illustrated in FIG. 10, the DLU 111 specifies "2" as the number of the partitioned matrices included in the second row of the first matrix MA to be moved, specifies "4" as the number of the partitioned matrices included in the third row of the first matrix MA to be moved, and specifies "6" as the number of the partitioned matrices included in the fourth row of the first matrix MA to be moved, for example.

As a result, the DLU 111 can store one or more first partitioned matrices in the DPUs so that one or more first partitioned matrices located in the same column in the first matrix MA are stored in different DPUs.

As illustrated in FIG. 9, when the partitioned matrices are stored in the DPUs, the DPU 00 and the DPU 01 use the partitioned matrices A0, A1, A2, A3, A4, A5, A6, A7, A8, A9, A10, and A11 in the same order in the calculation of the submatrix C0 and the submatrix C1, respectively. Thus, in that case, waiting time for the processing of the DPU 01 can occur when the submatrix C0 is calculated in the DPU 00, for example. In the same manner, in that case, waiting time for the processing of the DPU 00 can occur in the DPU 01 when the submatrix C1 is calculated.

Thus, the DLU 111 changes the arrangement of the partitioned matrix of which location is y-th from the top and x-th from the left (hereinafter also referred to as "B[y][x]") out of the partitioned matrices of the second matrix MB illustrated in FIG. 9 in accordance with Expression 2 below (S5).

$$B[(L-y+x*(L/M))\% L][x] \tag{2}$$

Specifically, as illustrated in FIG. 10, the DLU 111 rearranges the partitioned matrices B1, B5, B9, B13, B17, B21, B25, B29, B33, B37, B41, and B45 in the order of the partitioned matrices B37, B41, B45, B1, B5, B9, B13, B17, B21, B25, B29, and B33, and then stores the rearranged partitioned matrices in the DPUs, for example.

That is, the DLU 111 uses "3" that is calculated by dividing "12" that the number of the rows in the second matrix MB by "4" that is the number of the columns in the second matrix MB as the number of the partitioned matrices to be moved in each row, for example. Thus, the DLU 111 specifies "3" as the number of partitioned matrices included in the second column of the second matrix MB to be moved, and specifies "6" as the number of the partitioned matrices included in the third column of the second matrix MB to be moved as illustrated in FIG. 10, for example.

As a result, the DLU 111 can store one or more second partitioned matrices in the DPUs so that one or more second partitioned matrices located in the same row in the second matrix MB are stored in different DPUs in the second matrix MB.

The DLU 111 may change the arrangement of the partitioned matrices in the first matrix MA in the processing in Step S4 in accordance with Expression 3 below, for example.

$$A[y][((L-1)-x+(N-y)*(L/N))\% L] \tag{3}$$

Specifically, as illustrated in FIG. 11, the DLU 111 rearranges the partitioned matrices A0, A1, A2, A3, A4, A5, A6, A7, A8, A9, A10, and A11 in the order of the partitioned matrices A11, A10, A9, A8, A7, A6, A5, A4, A3, A2, A1, and A0, and then stores the rearranged partitioned matrices in the DPUs, for example. The DLU 111 rearranges the partitioned matrices A12, A13, A14, A15, A16, A17, A18, A19, A20, A21, A22, and A23 in the order of the partitioned matrices A21, A20, A19, A18, A17, A16, A15, A14, A13, A12, A23, and A22, and then stores the rearranged partitioned matrices in the DPUs, for example.

The DLU 111 may change the arrangement of the partitioned matrices in the second matrix MB in the processing in Step S5 in accordance with Expression 4 below, for example.

$$B[((L-1)-y+(M-x)*(L/M))\% L][x] \qquad (4)$$

Specifically, as illustrated in FIG. 11, the DLU 111 rearranges the partitioned matrices B0, B4, B8, B12, B16, B20, B24, B28, B32, B36, B40, and B44 in the order of the partitioned matrices B44, B40, B36, B32, B28, B24, B20, B16, B12, B8, B4, and B0, and then stores the rearranged partitioned matrices in the DPUs, for example. The DLU 111 rearranges the partitioned matrices B1, B5, B9, B13, B17, B21, B25, B29, B33, B37, B41, and B45 in the order of the partitioned matrices B33, B29, B25, B21, B17, B13, B9, B5, B1, B45, B41, and B37, and then stores the rearranged partitioned matrices in the DPUs, for example.

Specific Examples of Processing in Step S11 to Step S15

Figure 12:
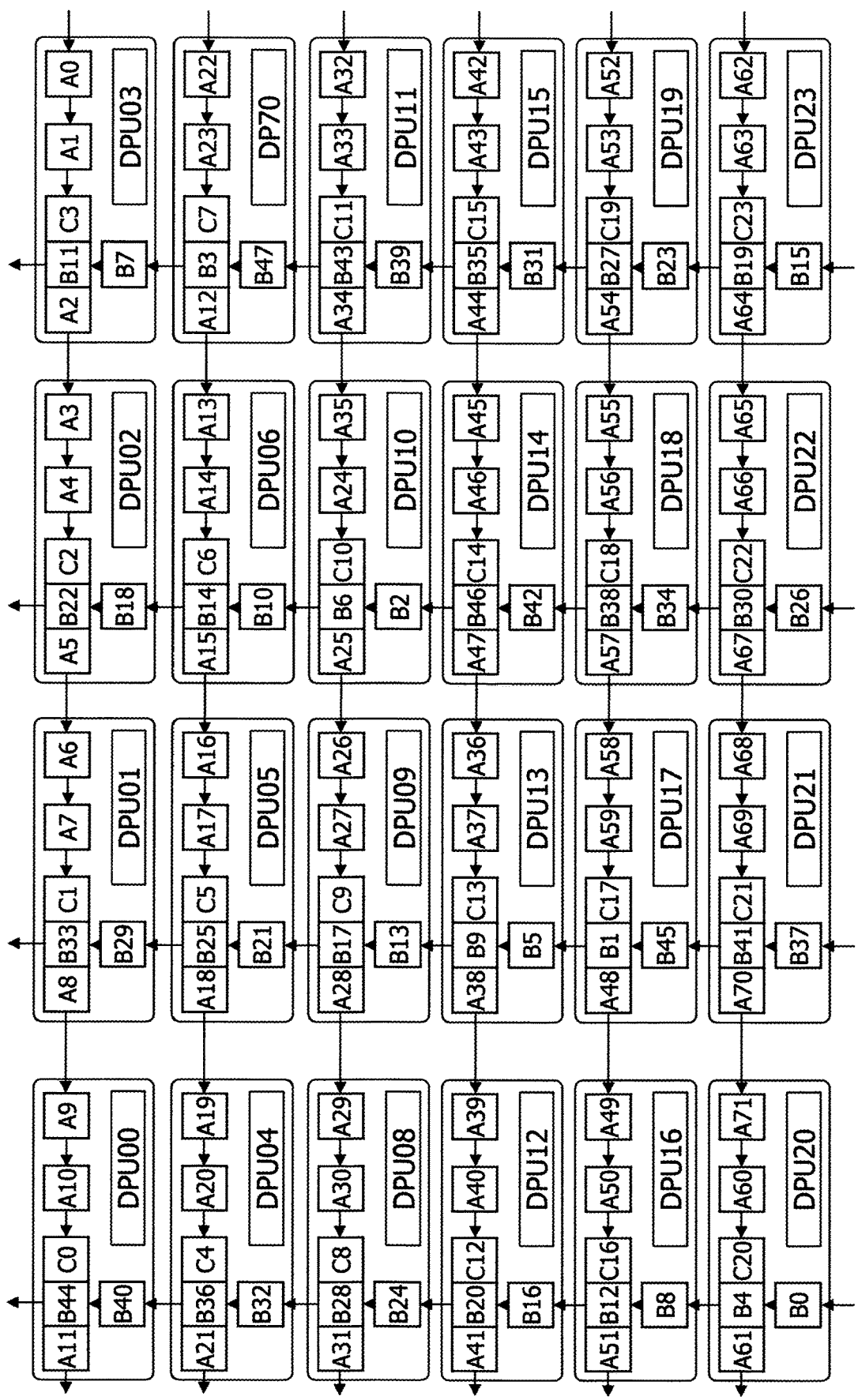
FIG. 12 is a diagram illustrating the specific examples of the processing in Step S11 to Step S15.
Figure 13:
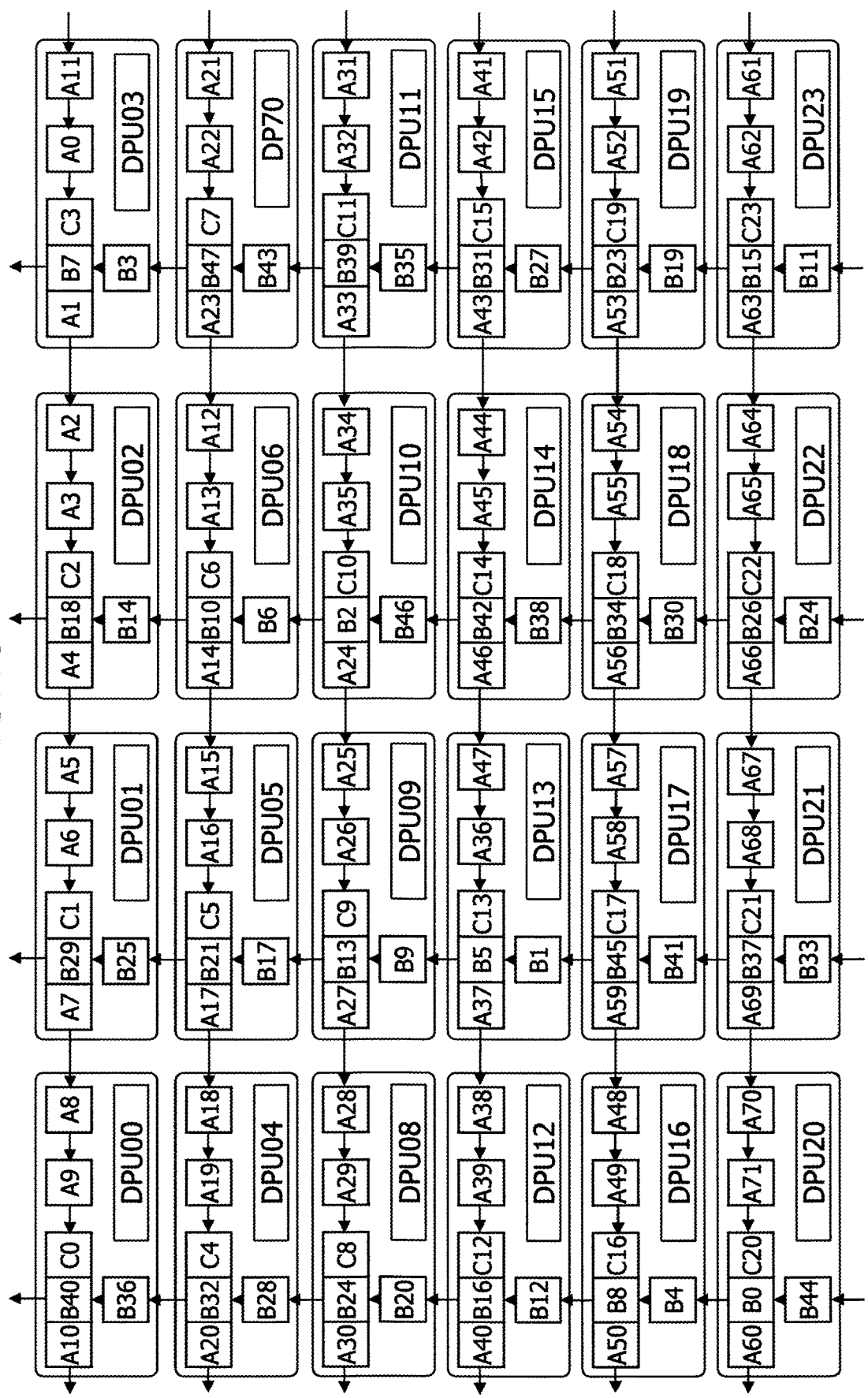
FIG. 13 is a diagram illustrating the specific examples of the processing in Step S11 to Step S15.
Figure 14:
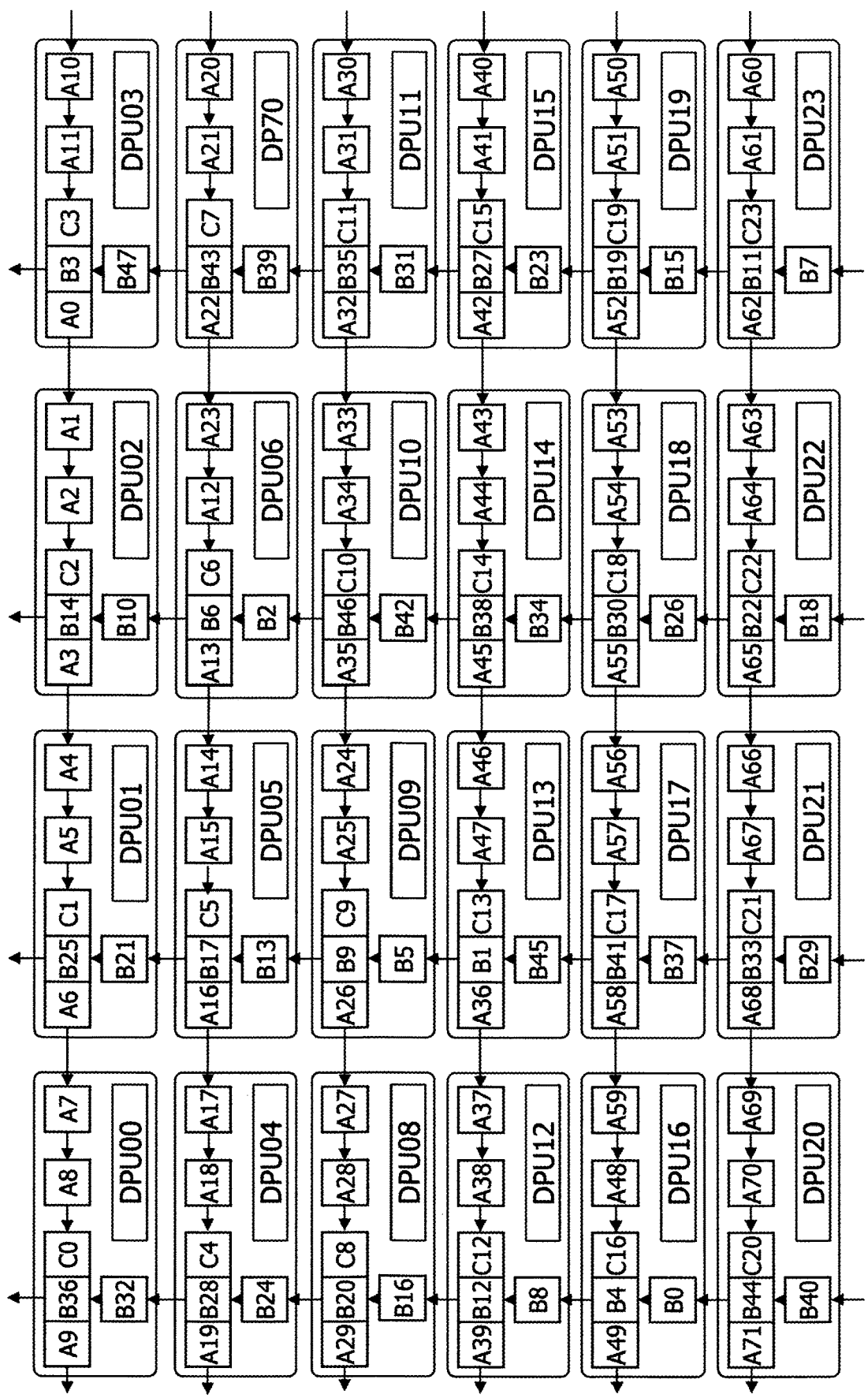
FIG. 14 is a diagram illustrating the specific examples of the processing in Step S11 to Step S15.

Next, the specific examples of the processing in Step S11 to Step S15 are described. FIG. 12 to FIG. 14 are diagrams illustrating the specific examples of the processing in Step S11 to Step S15. Symbols A0 and the like in FIG. 12 and the like correspond to the partitioned matrix A0 described in FIG. 9 and the like. The DPU 00 and the like in FIG. 12 and the like correspond to the DPU 00 described in FIG. 2 and the like. Description is made below on the assumption that the rearrangement of the partitioned matrices illustrated in FIG. 11 in Step S4 and Step S5 has been performed.

In the example illustrated in FIG. 12, the partitioned matrices A9, A10, and A11, the partitioned matrices B40 and B44, and the submatrix C0 are stored in the DPU 00, for example. The DPU 00 illustrated in FIG. 12 multiplies the partitioned matrix A11 and the partitioned matrix B44 stored in the DPU 00 together, and adds the calculation result to the submatrix C0. The partitioned matrices A9 and A10 and the partitioned matrix B40 are stored in the DPU 00 illustrated in FIG. 12. That is, the partitioned matrices A9 and A10 and the partitioned matrix B40 are stored in the DPU 00 as the partitioned matrices to be subsequently multiplied and added.

Then, as illustrated in FIG. 13, the DPU 00 multiplies the partitioned matrix A10 and the partitioned matrix B40 together, and adds the calculation result to the submatrix C0. That is, the DPU 00 multiplies and adds the combination of the partitioned matrices stored in the DPU 00 the earliest out of the partitioned matrices waiting in the state illustrated in FIG. 12.

The DPU 00 illustrated in FIG. 13 has received the partitioned matrix A8 stored the DPU 01 forming a torus structure with the DPU 00 and the partitioned matrix B36 stored in the DPU 04 also forming a torus structure with the DPU 00 in the state illustrated in FIG. 12. The DPU 00 illustrated in FIG. 13 has transmitted the partitioned matrix A11 and the partitioned matrix B44 on which multiplication and addition have been performed in the state illustrated in FIG. 12 to the DPU 03 and the DPU 20 each forming a torus structure with the DPU 00.

Then, as illustrated in FIG. 14, the DPU 00 multiplies the partitioned matrix A9 and the partitioned matrix B36 together, and adds the calculation result to the submatrix C0. That is, the DPU 00 multiplies and adds the combination of the partitioned matrices stored in the DPU 00 the earliest out of the partitioned matrices waiting in the state illustrated in FIG. 13.

The DPU 00 illustrated in FIG. 14 has received the partitioned matrix A7 stored in the DPU 01 forming a torus structure with the DPU 00 and the partitioned matrix B32 stored in the DPU 04 also forming the torus structure in the state illustrated in FIG. 13. The DPU 00 illustrated in FIG. 14 has transmitted the partitioned matrix A10 and the partitioned matrix B40 on which multiplication and addition have been performed in the state illustrated in FIG. 13 to the DPU 03 and the DPU 20 each forming a torus structure with the DPU 00.

That is, the DPU 00 can receive all the partitioned matrixes needed in the calculation of the submatrix C0 by repeating the circulation of the partitioned matrices in accordance with the torus structure. Thus, the DPU 00 can calculate the submatrix C0 without accessing the memory 112.

Details of First Embodiment

Next, the details of the first embodiment are described. FIG. 15 to FIG. 18 are flowcharts illustrating the details of the matrix computing processing in the first embodiment. FIG. 19 to FIG. 30 are diagrams illustrating the details of the matrix computing processing in the first embodiment. The matrix computing processing illustrated in FIG. 15 to FIG. 18 is described with reference to FIG. 19 to FIG. 30.

Figure 15:
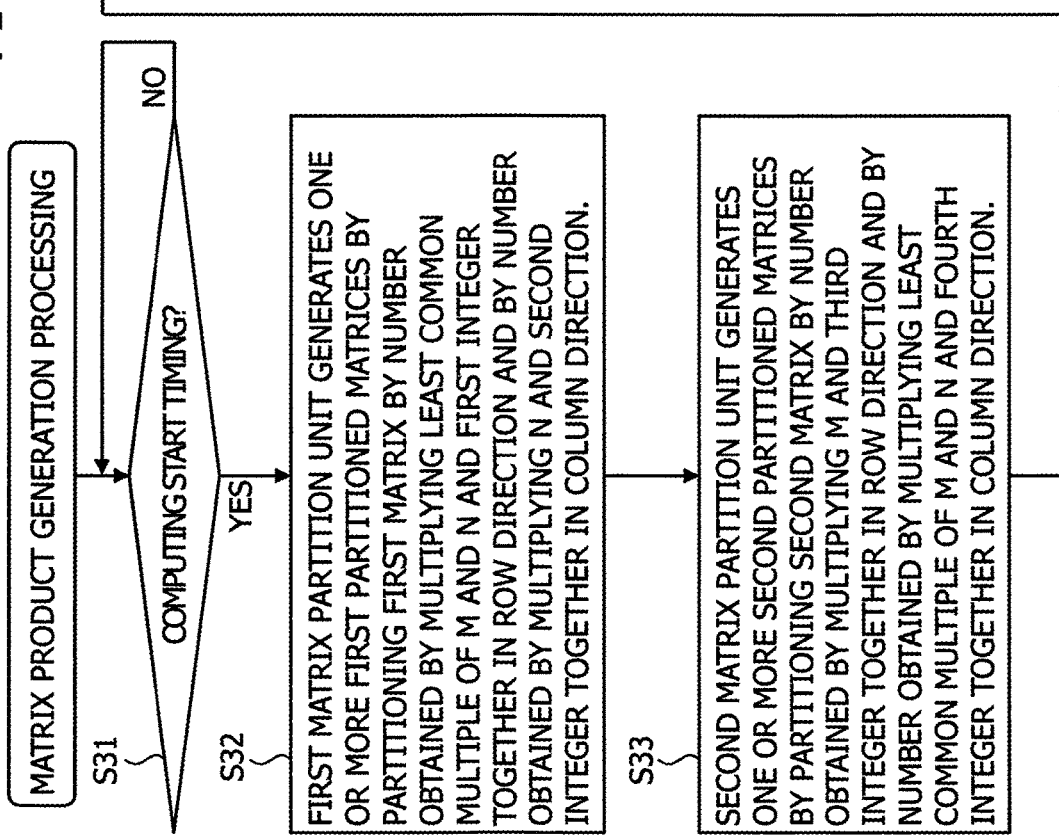
FIG. 15 is a flowchart illustrating the details of the matrix computing processing in the first embodiment.

As illustrated in FIG. 15, the first matrix partition unit 121 of the information processing apparatus 1 waits until the computing start timing (NO in Step S31). When the computing start timing comes (YES in Step S31), the first matrix partition unit 121 generates one or more first partitioned matrices by partitioning the first matrix MA by a number obtained by multiplying the least common multiple of M and N and an integer (hereinafter also referred to as "first integer") together in the row direction and by a number obtained by multiplying N and an integer (hereinafter also referred to as "second integer") together in the column direction, for example (S32).

Specifically, as illustrated in FIG. 19, the first matrix partition unit 121 generates one or more first partitioned matrices by partitioning the first matrix MA by once the number of the least common multiple of M and N in the row direction and by once the number of N in the column direction, for example. That is, in that case, the first matrix partition unit 121 partitions the first matrix MA into once the number of the first partitioned matrices, as compared to the partitioned matrices as illustrated in FIG. 9.

The second matrix partition unit 122 of the information processing apparatus 1 generates one or more second partitioned matrices by partitioning the second matrix MB by a number obtained by multiplying M and an integer (hereinafter also referred to as "third integer") together in the row direction and by a number obtained by multiplying the least common multiple of M and N and an integer (hereinafter also referred to as "fourth integer") together in the column direction, for example (S33).

Specifically, as illustrated in FIG. 19, the second matrix partition unit 122 generates one or more second partitioned matrices by partitioning the second matrix MB by twice the number of M in the row direction and by twice the number of the least common multiple of M and N in the column direction, for example. That is, in that case, the second matrix partition unit 122 partitions the second matrix MB into four times the number of the second partitioned matrices as illustrated in FIG. 9.

Then, the matrix storage unit 123 of the information processing apparatus 1 stores one or more first partitioned matrices in the storage units of the DPUs so that the first partitioned matrices for every second integer located in the same column in the first matrix MA are stored in the DPUs arranged in different columns in the DLU 111 and submatrices formed of the first partitioned matrices of which number in the row direction is a first integer and of which number in the column direction is a second integer are stored in the storage units of the DPUs, for example (S34).

That is, when the first matrix partition unit 121 partitions the first matrix MA into a number of first partitioned matrices larger than the number of the DPUs, the matrix storage unit 123 stores a submatrix including a plurality of first partitioned matrices in at least one DPU, for example.

The matrix storage unit 123 stores one or more second partitioned matrices of which number in the row direction is M and of which number in the column direction is the least common multiple of M and N out of one or more second partitioned matrices in the storage units of the DPUs so that one or more second partitioned matrices located in the same row in the second matrix MB are stored in the DPUs arranged in different rows in the DLU 111, for example (S35).

That is, when the number of one or more second partitioned matrices generated in the processing in S33 is larger than the number of the DPUs, the DLU 111 can start the circulation of the partitioned matrices among the DPUs forming a torus structure in response to each DPU storing at least one or more second partitioned matrices therein. Thus, in the processing in S35, the DLU 111 stores only part of the one or more generated second partitioned matrices in the storage units of the DPUs and performs the subsequent processing, for example.

Figure 20:
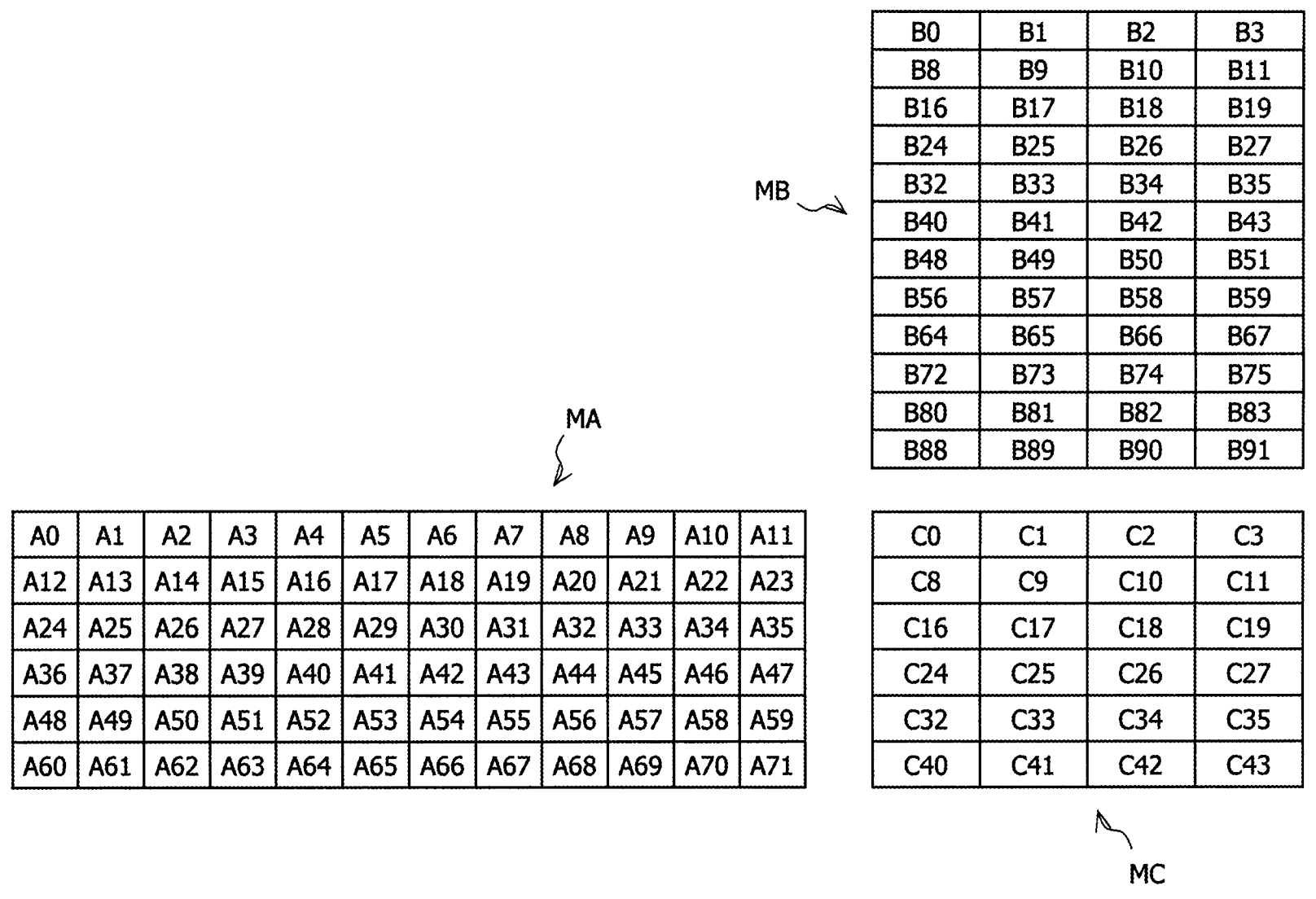

Specifically, as illustrated in FIG. 20, the matrix storage unit 123 stores the second partitioned matrices located in the first row to the 12th row and located in the first column to the fourth column out of one or more second partitioned matrices illustrated in FIG. 19 in the storage units of the DPUs, for example.

Figure 16:
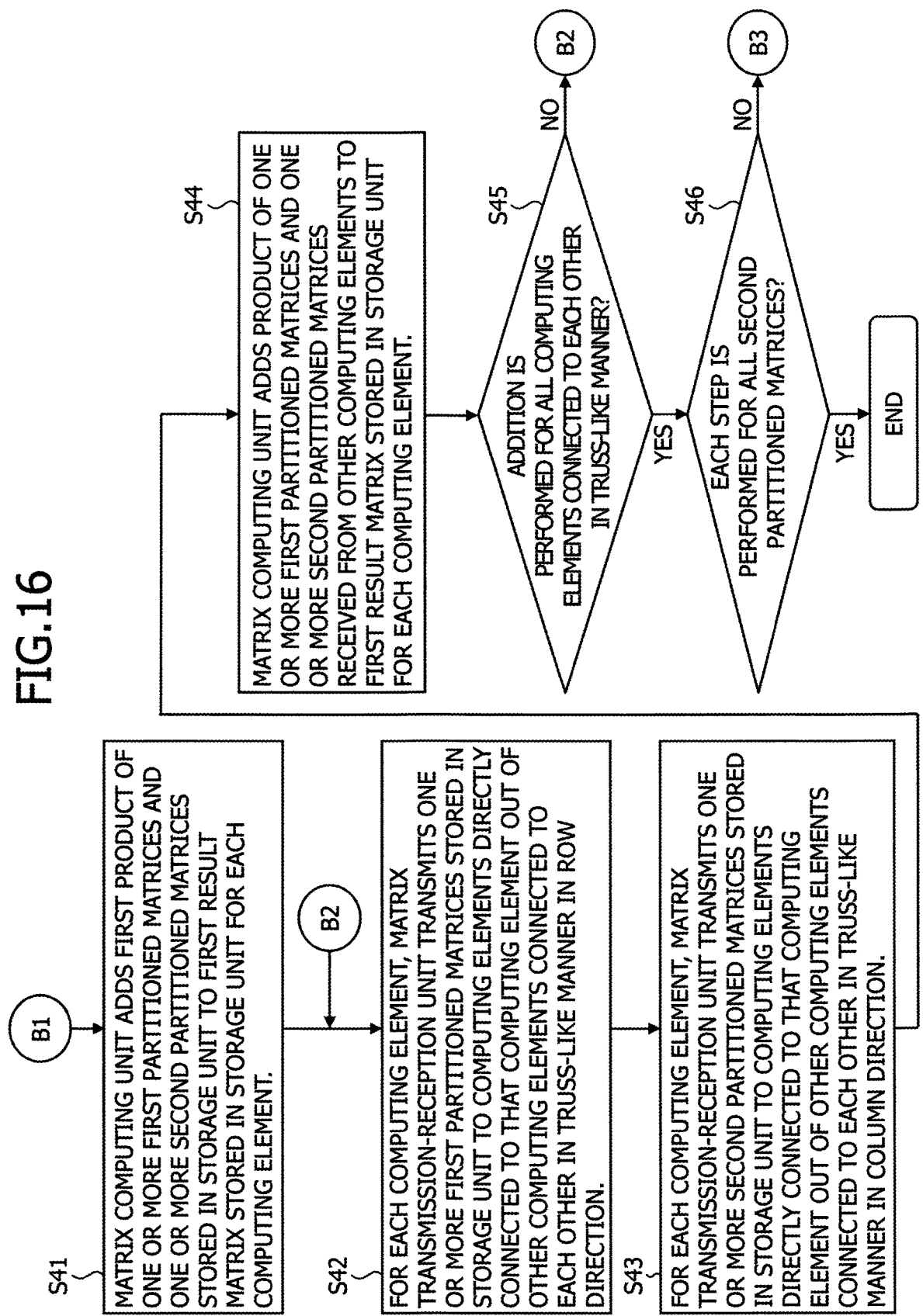
FIG. 16 is a flowchart illustrating the details of the matrix computing processing in the first embodiment.

Then, as illustrated in FIG. 16, the matrix computing unit 124 adds the first product of one or more first partitioned matrices and one or more second partitioned matrices stored in the storage unit to the first result matrix stored in the storage unit for each DPU (S41).

Specifically, as illustrated in FIG. 20, the matrix computing unit 124 of the information processing apparatus 1 adds the first product of the first partitioned matrices stored in the processing in Step S34 and the second partitioned matrices stored in the processing in Step S35 (a part of one or more second partitioned matrices generated in the processing in Step S33) to the first result matrix (the submatrices located in the first column to the fourth column of the third matrix MC illustrated in FIG. 19), for example.

As a result, the matrix computing unit 124 can start the calculation of the product of the first matrix MA and a part of the second matrix MB in response to the completion of the storage of a part of the second matrix MB into the DPUs without waiting for the completion of the storage of the entire second matrix MB into the DPUs. While the matrix computing unit 124 calculates the product of the first matrix MA and a part of the second matrix MB, the matrix storage unit 123 can store another part of the second matrix MB in the DPUs.

Thus, the information processing apparatus 1 can store the second matrix MB in the DPUs and calculate the product of the first matrix MA and the second matrix MB in parallel with each other. As a result, the information processing apparatus 1 can calculate the product of the first matrix MA and the second matrix MB efficiently (at high-speed).

In the processing in Step S35, the matrix storage unit 123 may store one or more second partitioned matrices in the storage units of the DPUs so that the second partitioned matrices for every third integer located in the same row in the second matrix MB are stored in the DPUs arranged in different rows in the DLU 111 and the submatrices formed of the second partitioned matrices of which number in the row direction is the third integer and of which number in the column direction is the fourth integer are stored in the storage units of the DPUs, for example. In that case, the DLU 111 performs the subsequent processing after all of one or more second partitioned matrices are stored in the storage units of the DPUs. The processing in Step S34 to Step S41 are described in detail below.

Details of Processing in Step S34 to Step S41

Figure 17:
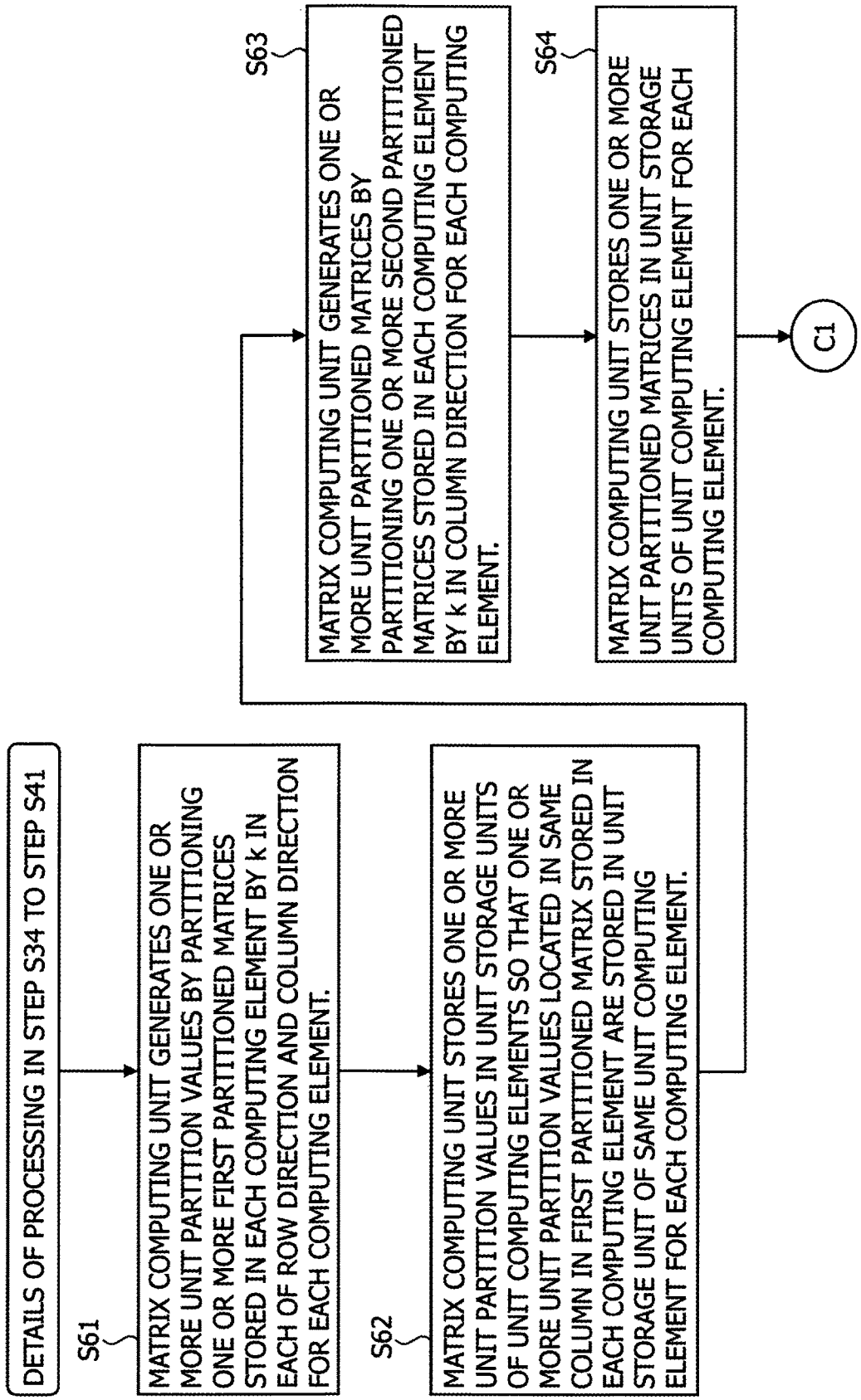
FIG. 17 is a flowchart illustrating the details of the matrix computing processing in the first embodiment.
Figure 18:
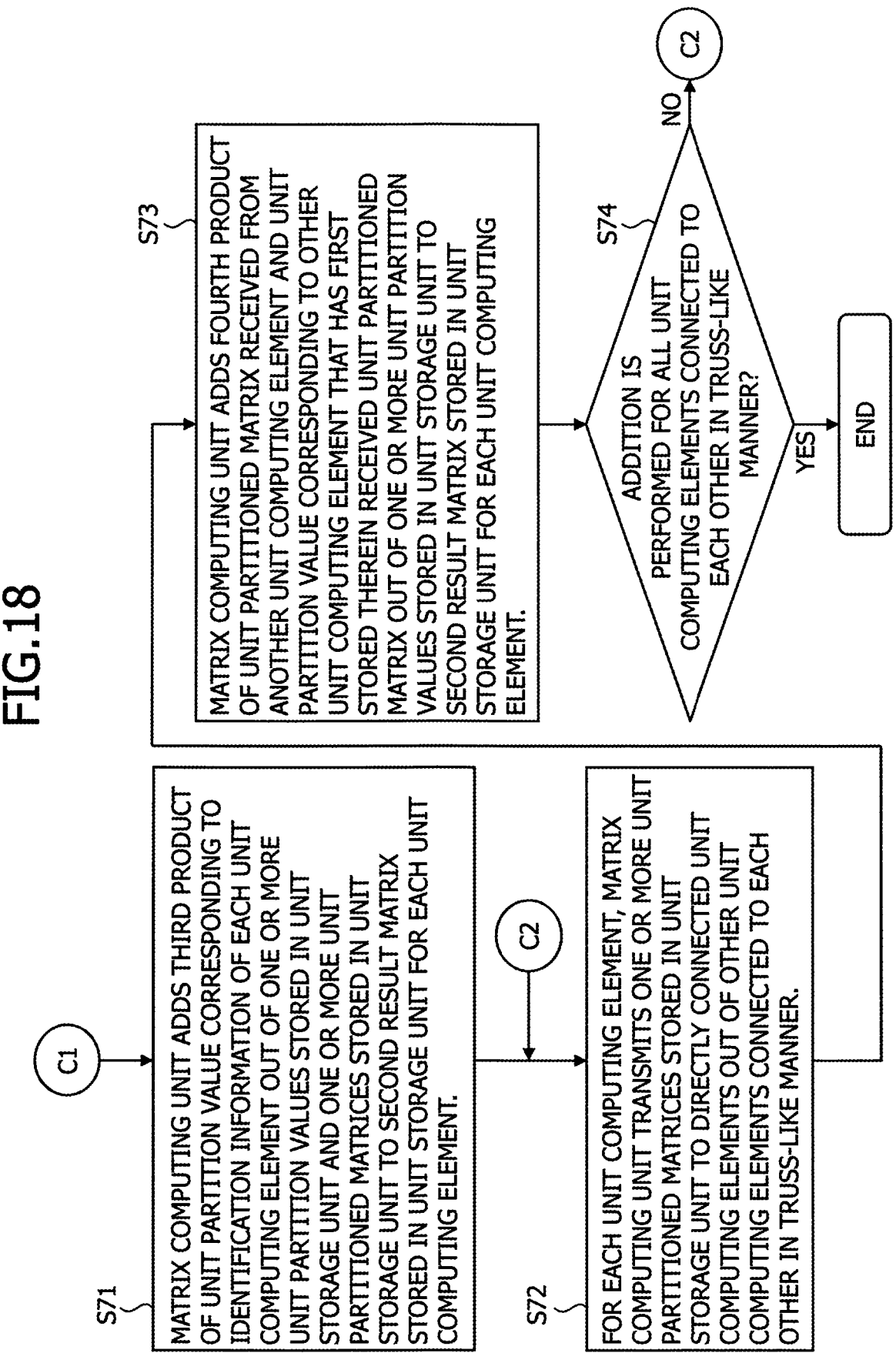
FIG. 18 is a flowchart illustrating the details of the matrix computing processing in the first embodiment.

Next, the details of the processing in Step S34 to Step S41 are described. FIG. 17 and FIG. 18 are flowcharts illustrating the details of the processing in Step S34 to Step S41.

Figure 21:
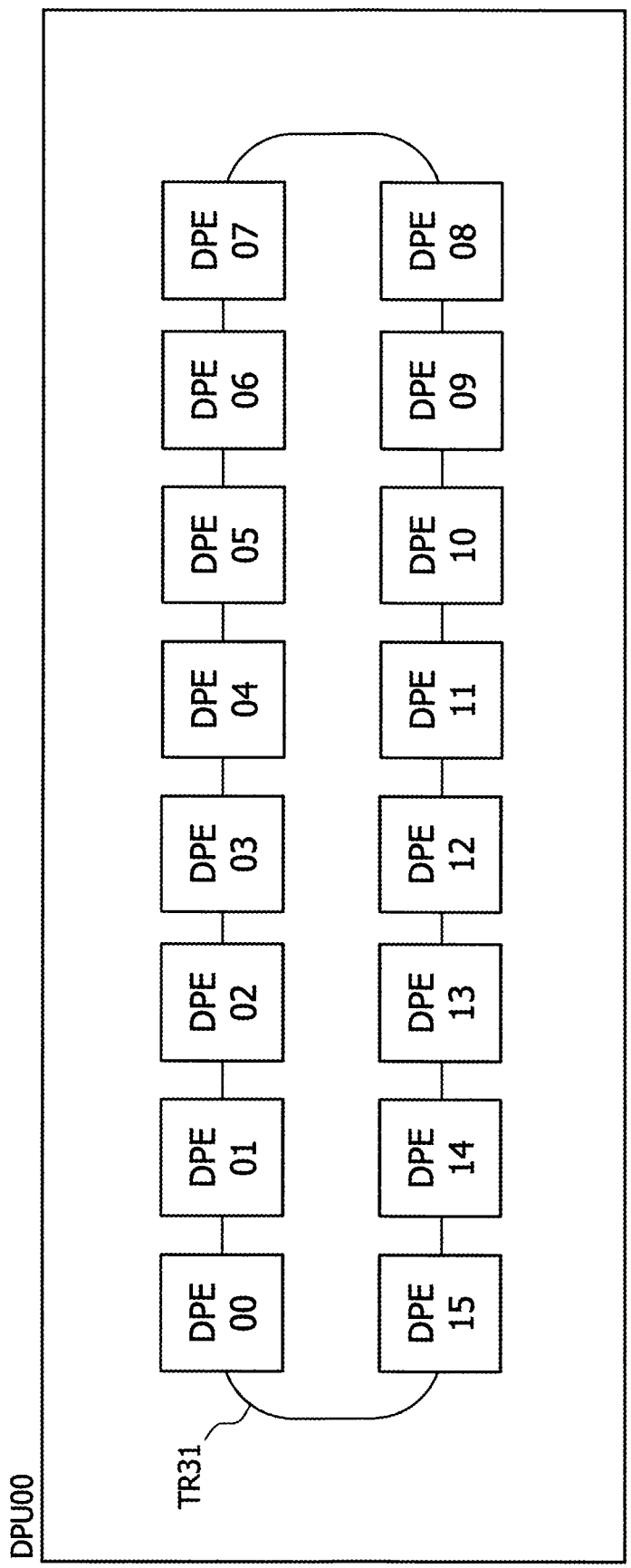
FIG. 21 is a diagram illustrating the details of the matrix computing processing in the first embodiment.

First, the configuration of the DPU is described. FIG. 21 is a diagram illustrating the configuration of the DPU 00. As illustrated in FIG. 21, the DPU 00 includes 16 arranged computing elements (hereinafter also referred to as "DPE" or "unit computing element"). In the DPU 00, the DPEs form a torus structure TR31.

Specifically, in the example illustrated in FIG. 21, a DPE 0 is connected to a DPE 15 and a DPE 2, and a DPE 1 is connected to the DPE 0 and the DPE 2, for example. As a result, the DPE 0 can share (refer to) the matrices stored by the other DPEs forming the torus structure TR31, for example. The description of the other configurations included in FIG. 21 is omitted.

Figure 22:
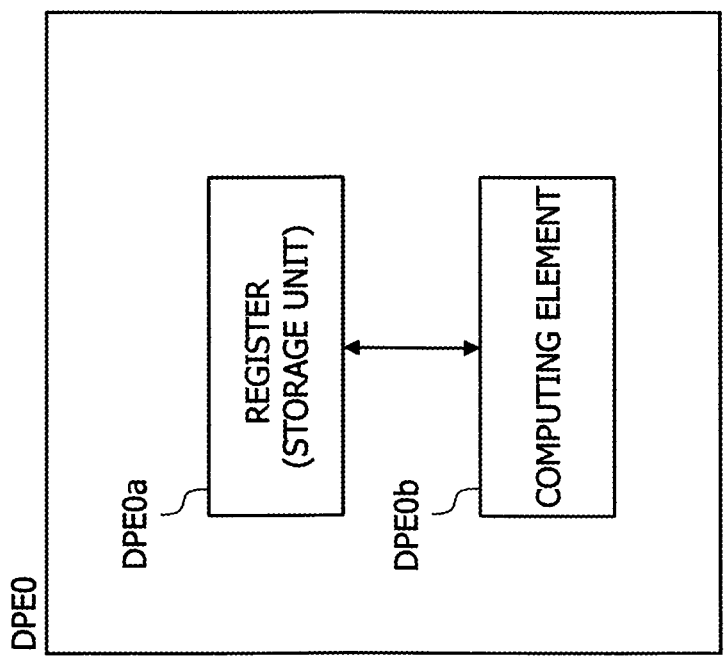
FIG. 22 is a diagram illustrating the details of the matrix computing processing in the first embodiment.

Now, the configuration of the DPE is described. FIG. 22 is a diagram illustrating the configuration of the DPE 0. As illustrated in FIG. 22, the DPE 0 includes a register DPE0a (hereinafter also referred to as "unit storage unit DPE0a") configured to store the submatrices and the like therein and a computing element DPE0b configured to calculate the product of the submatrices, for example. That is, the registers included in the DPE 0 to the DPE 15 function as storage units of the DPU 00. The registers included in the DPE 0 to the DPE 15 are hereinafter also collectively referred to as "unit storage unit DPEa".

Next, the flowchart of the processing in Step S34 to Step S41 is described.

The matrix computing unit 124 generates one or more unit partition values by partitioning one or more first partitioned matrices stored in each DPU by k (k is an integer of 1 or more) in the row direction and the column direction for each DPU (S61). That is, when k is the number of the DPEs arranged in each DPU, the matrix computing unit 124 generates one or more unit partition values by partitioning one or more first partitioned matrices stored in each DPU into 256 (16×16) parts, for example. Specifically, the matrix computing unit 124 generates one or more unit partition values by partitioning the partitioned matrices A0, A1, and A2 that are partitioned matrices stored in the DPU 00 out of the first matrix MA into 256 parts, for example.

The matrix computing unit 124 stores one or more unit partition values in the unit storage units DPEa of the DPEs so that one or more unit partition values located in the same column in one or more first partitioned matrices stored in each DPU are stored in the unit storage unit DPEa of the same DPE for each DPU (S62).

The matrix computing unit 124 generates one or more unit partitioned matrices by partitioning one or more second partitioned matrices stored in each DPU by k in the column direction for each DPU (S63). That is, for example, when k is the number of the DPEs arranged in each DPU, the matrix computing unit 124 generates one or more unit partitioned matrices by partitioning one or more second partitioned matrices stored in each DPU into 16 parts in the column direction. Specifically, the matrix computing unit 124 generates one or more unit partitioned matrices by partitioning the partitioned matrices B0 and B1 that are the partitioned matrices stored in the DPU 00 out of the second matrix MB into 16 parts in the column direction, for example.

Then, the matrix computing unit 124 stores one or more unit partitioned matrices in the unit storage unit DPEa of the DPE for each DPU (S64).

Next, as illustrated in FIG. 18, the matrix computing unit 124 adds a third product of the unit partition value corresponding to the identification information of each DPE out of one or more unit partition values stored in the unit storage unit DPEa and one or more unit partitioned matrices stored in the unit storage unit DPEa to the second result matrix stored in the unit storage unit DPEa for each DPE (S71).

Then, for each DPE, the matrix computing unit 124 transmits one or more unit partitioned matrices stored in the unit storage unit DPEa to DPEs directly connected to that DPE out of the other DPEs connected to each other in a torus-like manner (S72).

Then, for each DPE, the matrix computing unit 124 adds a fourth product of the unit partitioned matrix received from another DPE and the unit partition value corresponding to the identification information of the other DPE that has first stored therein the unit partitioned matrix out of one or more unit partition values stored in the unit storage unit DPEa to the second result matrix stored in the unit storage unit DPEa (S73).

The matrix computing unit 124 determines whether the product calculated from one or more unit partitioned matrices stored in each DPE is added to the second result matrix in each of the DPEs connected to each other in a torus-like manner (S74). As a result, when it is determined that the product is added to the second result matrix in each of the DPEs connected to each other in a torus-like manner (YES in Step S74), the matrix computing unit 124 ends the processing of Step S34 to Step S41. When it is determined that the product is not added to the second result matrix in each of the DPEs connected to each other in a torus-like manner (NO in Step S74), the matrix computing unit 124 performs the processing in Step S72 in the subsequent steps again.

Specific Examples of Processing in Step S61 to Step S74

Next, the specific examples of the processing in Step S61 to Step S74 are described. FIG. 23 to FIG. 28 are diagrams illustrating the specific examples of the processing in Step S61 to Step S74. Specifically, FIG. 23 to FIG. 28 are diagrams illustrating the specific examples of the processing in Step S61 to Step S74 performed in the DPU 00. In FIG. 23 to FIG. 28, only a part of the unit partition value and the unit partitioned matrix is illustrated.

The matrix computing unit 124 partitions the partitioned matrices A0, A1, and A2 that are partitioned matrices in the first matrix MA stored in the DPU 00 into 256 parts, and generates 256 unit partition values, for example (S61). Then, the matrix computing unit 124 stores the unit partition values located in the same column of the 256 generated unit partition values in each of the unit storage units DPEa of the DPEs (S62).

Figure 23:
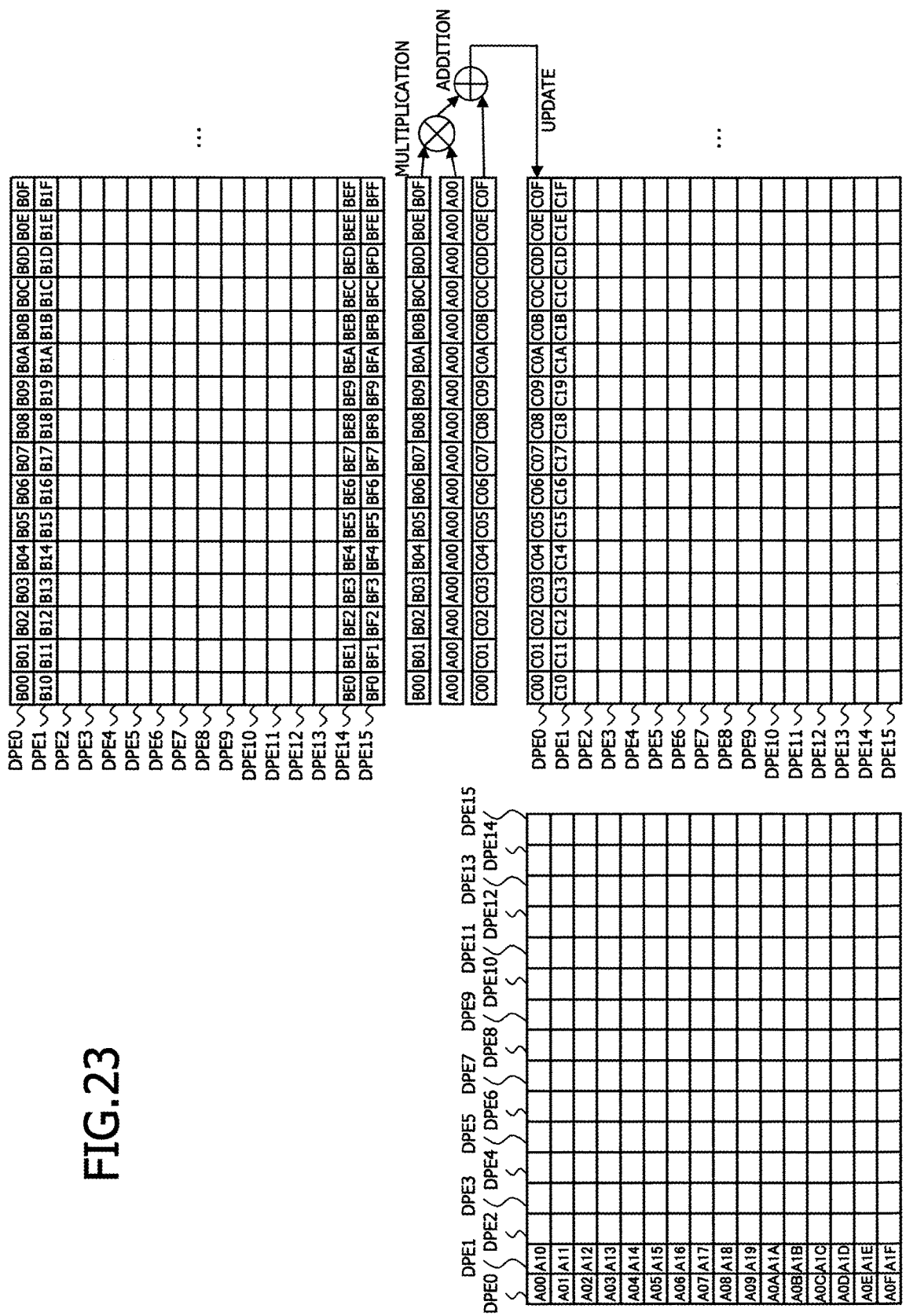
FIG. 23 is a diagram illustrating the details of the matrix computing processing in the first embodiment.

Specifically, as illustrated in FIG. 23, the matrix computing unit 124 stores unit partition values A00 and A01 to A0F in the DPE 0, and stores unit partition values A10 and A11 to A1F in the DPE 1 out of the 256 generated unit partition values, for example.

The matrix computing unit 124 partitions the partitioned matrices B0 and B1 that are partitioned matrices of the second matrix MB stored in the DPU 00 into 16 parts in the column direction, and generates 16 unit partitioned matrices (S63). The matrix computing unit 124 stores the 16 generated unit partitioned matrices in the unit storage units DPEa of the DPEs (S64).

Specifically, as illustrated in FIG. 23, the matrix computing unit 124 stores the unit partitioned matrices including values B00 to B0F in the DPE 0, and stores the unit partitioned matrices including values B10 to B1F in the DPE 1 out of 16 generated unit partitioned matrices, for example.

Then, the matrix computing unit 124 adds the third product of the unit partition value corresponding to the identification information of the DPE 0 out of the unit partition values stored in the DPE 0 and the unit partitioned matrix stored in the DPE 0 to the second result matrix stored in the DPE 0 (S71). An identification number of each DPE is a number added to the end of the DPE, for example. An identification number in the unit partition value is a number added to each location in which each unit partition value is stored, for example.

Specifically, as illustrated in FIG. 23, the matrix computing unit 124 specifies the unit partition value A00 from the unit partition values stored in the DPE 0 when the identification information of the DPE 0 and the identification information of the unit partition value A00 are "0". In that case, as illustrated in FIG. 23, the matrix computing unit 124 multiplies the unit partitioned matrices including the values B00 to B0F and the unit partition value A00 stored in the DPE 0 together, and adds the obtained result to second result matrices C00 to C0F stored in the DPE 0.

Figure 24:
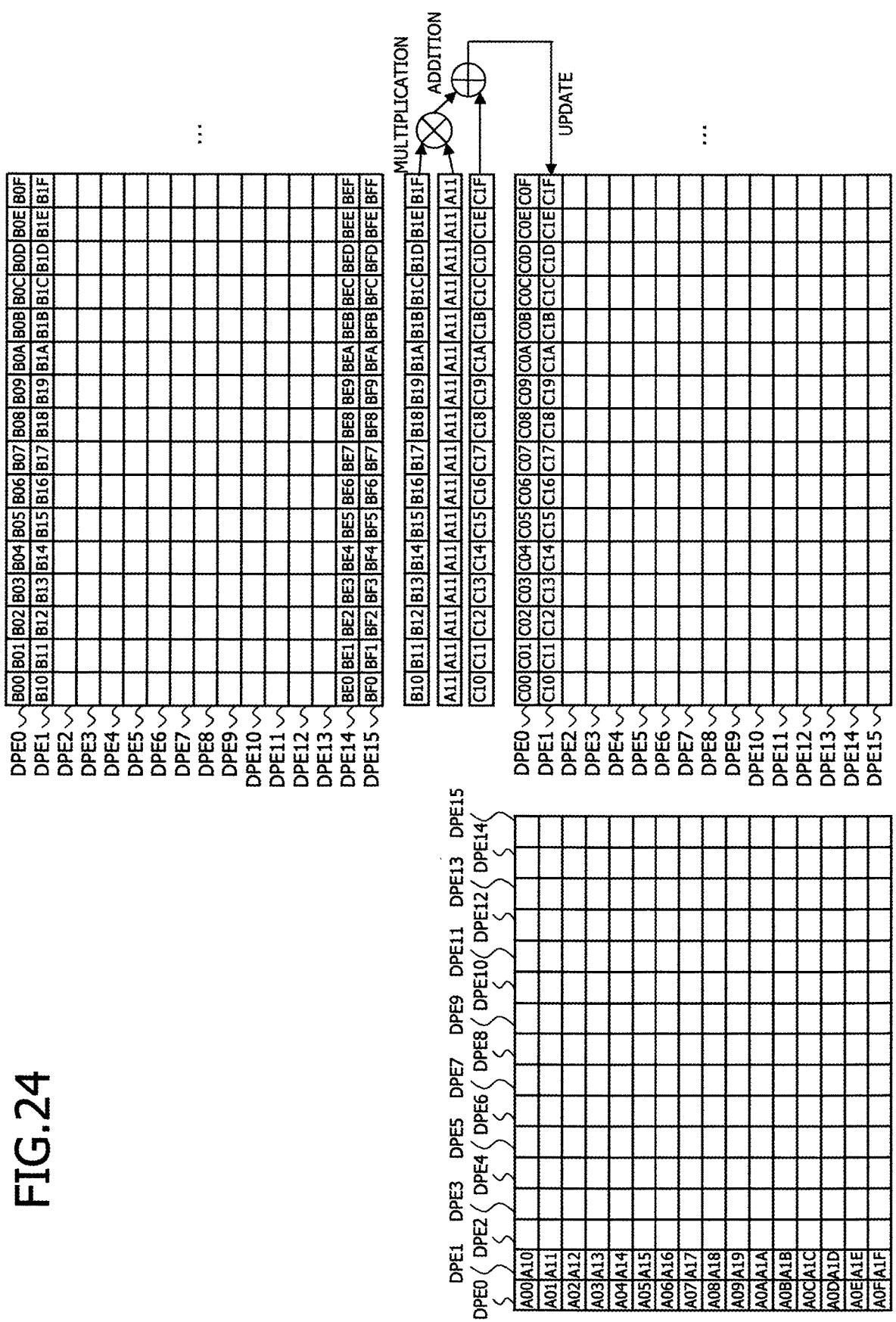
FIG. 24 is a diagram illustrating the details of the matrix computing processing in the first embodiment.

Similarly, as illustrated in FIG. 24, the matrix computing unit 124 specifies a unit partition value A11 from the unit partition values stored in the DPE 1 when the identification information of the DPE 1 and the identification information of the unit partition value A11 are "1". In that case, as illustrated in FIG. 24, the matrix computing unit 124 multiplies the unit partitioned matrices including the values B10 to B1F and the unit partition value A11 stored in the DPE 1 together, and adds the obtained result to second result matrices C10 to C1F stored in the DPE 1.

Then, the matrix computing unit 124 transmits one or more unit partitioned matrices stored in each DPE to DPEs directly connected to that DPE out of the other unit computing elements connected to each other in a torus-like manner, for example (S72).

Figure 25:
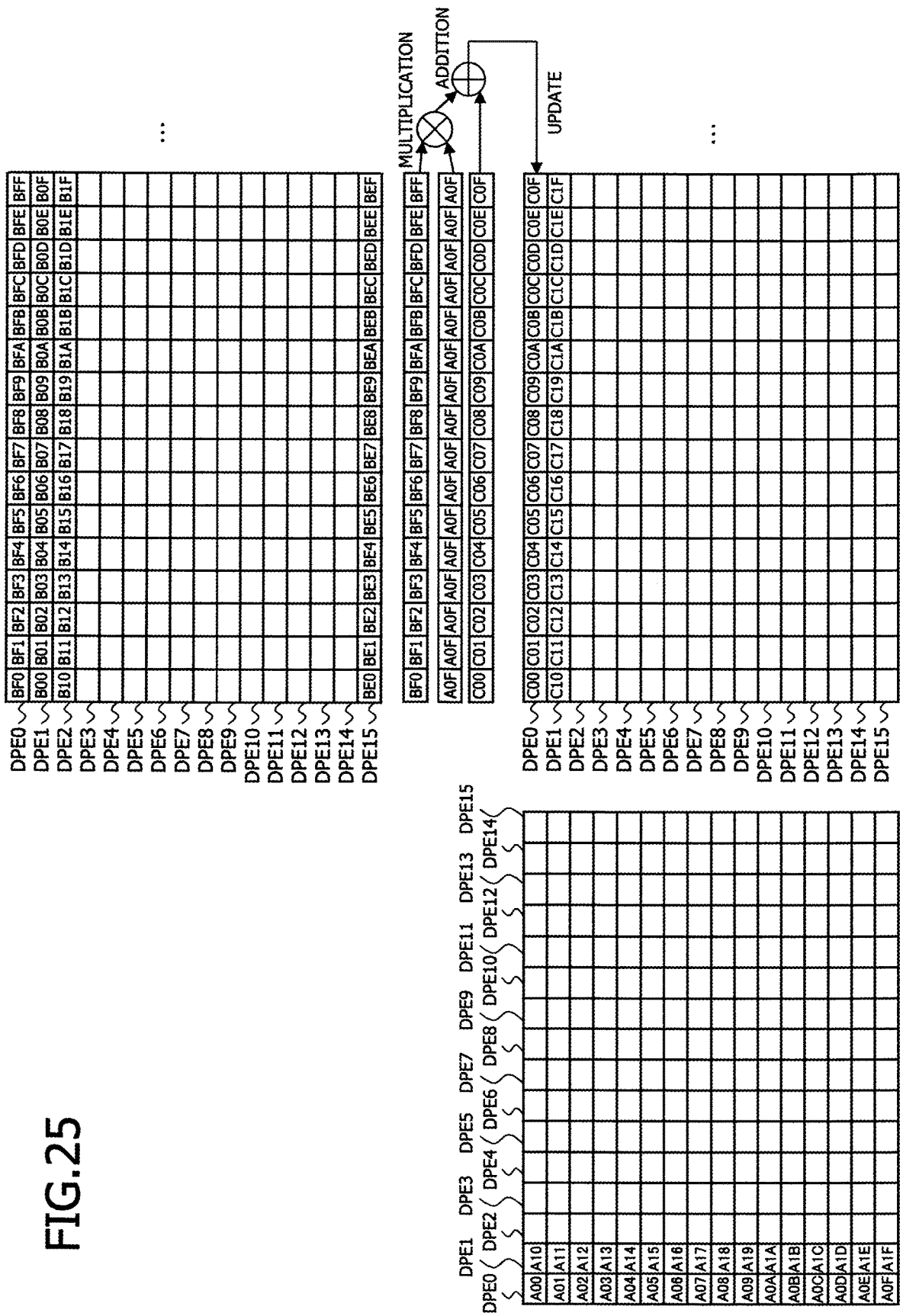
FIG. 25 is a diagram illustrating the details of the matrix computing processing in the first embodiment.

Specifically, as illustrated in FIG. 25, the matrix computing unit 124 transmits the unit partitioned matrices including the values B10 to B1F stored in the DPE 1 to the DPE 2, and transmits the unit partitioned matrices including values B00 to B0F stored in the DPE 0 to the DPE 1, for example.

The matrix computing unit 124 adds the fourth product of the unit partitioned matrices received from the DPE 15 and the unit partition value corresponding to the identification information of the DPE 15 that has first stored therein the received unit partitioned matrices out of the unit partition values stored in the DPE 15 to the second result matrix stored in the DPE 0, for example (S73).

Specifically, as illustrated in FIG. 25, the matrix computing unit 124 specifies a unit partition value A0F from the unit partition values stored in the DPE 0 when the identification information of the DPE 15 that has first stored therein the unit partitioned matrices received by the DPE 0 and the identification information of the unit partition value A0F are "15". Then, as illustrated in FIG. 25, the matrix computing unit 124 multiplies the unit partitioned matrices including values BF0 to BFF and the unit partition value A0F stored in the DPE 0 together, and adds the obtained result to the second result matrices C00 to C0F stored in the DPE 0.

Figure 26:
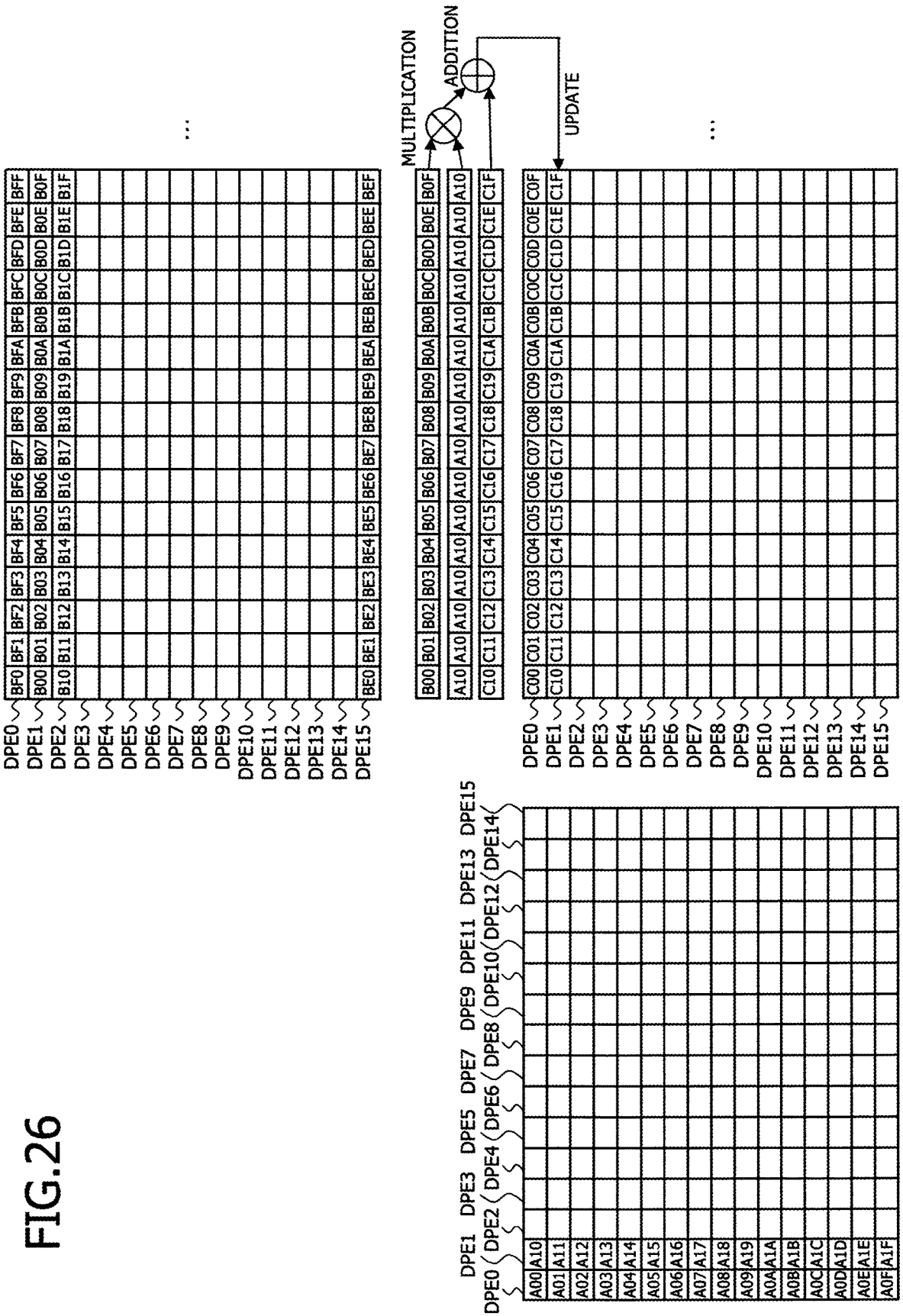
FIG. 26 is a diagram illustrating the details of the matrix computing processing in the first embodiment.

Similarly, as illustrated in FIG. 26, the matrix computing unit 124 specifies a unit partition value A10 from the unit partition values stored in the DPE 1 when the identification information of the DPE 0 that has first stored therein the unit partitioned matrices received by the DPE 1 and the identification information of the unit partition value A10 are "0". As illustrated in FIG. 26, the matrix computing unit 124 multiplies the unit partitioned matrices including the values B00 to B0F and the unit partition value A10 stored in the DPE 1 together, and adds the obtained result to the second result matrices C10 to C1F stored in the DPE 1.

When the processing in Step S72 and Step S73 is not performed in any of the DPEs connected to each other in a torus-like manner (NO in Step S74), the matrix computing unit 124 performs the processing in Step S72 and the subsequent steps again.

Figure 27:
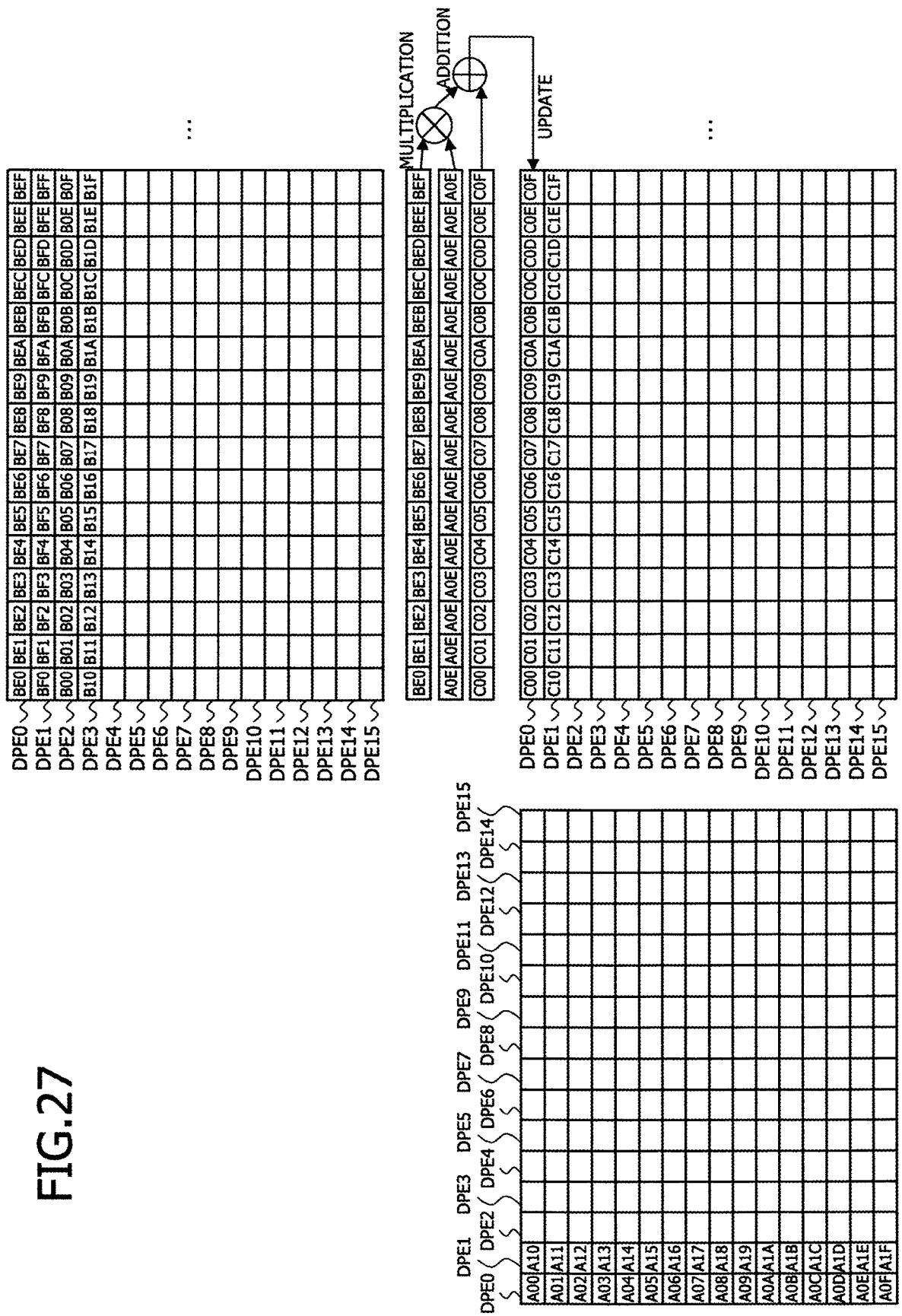
FIG. 27 is a diagram illustrating the details of the matrix computing processing in the first embodiment.

Specifically, as illustrated in FIG. 27, the matrix computing unit 124 specifies a unit partition value A0E from the unit partition values stored in the DPE 0 when the identification information of the DPE 14 that has first stored therein the unit partitioned matrices received by the DPE 0 and the identification information of the unit partition value A0E are "14". As illustrated in FIG. 27, the matrix computing unit 124 multiplies the unit partitioned matrices including values BE0 to BEF and the unit partition value A0E stored in the DPE 0 together, and adds the obtained result to the second result matrices C00 to C0F stored in the DPE 0.

Figure 28:
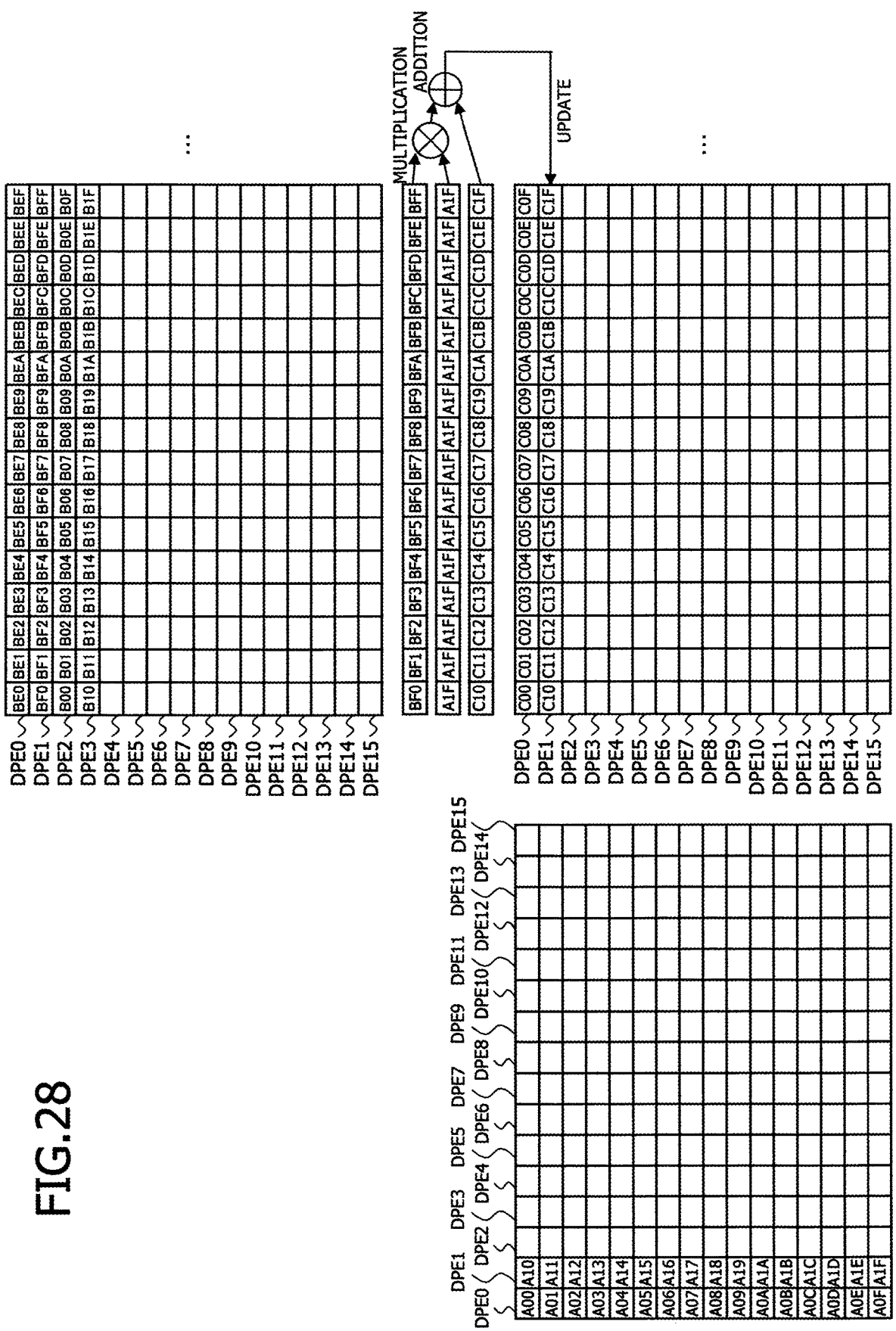
FIG. 28 is a diagram illustrating the details of the matrix computing processing in the first embodiment.

Similarly, as illustrated in FIG. 28, the matrix computing unit 124 specifies a unit partition value A1F from the unit partition values stored in the DPE 1 when the identification information of the DPE 15 that has first stored therein the unit partitioned matrices received by the DPE 1 and the identification information of the unit partition value A1F are "15". As illustrated in FIG. 28, the matrix computing unit 124 multiplies the unit partitioned matrices including values BF0 to BFF and the unit partition value A1F stored in the DPE 1 together, and adds the obtained result to the second result matrix C10 to C1F stored in the DPE 1.

As a result, the matrix computing unit 124 can calculate the matrix product in each DPU more efficiently.

Returning to FIG. 16, for each DPU, the matrix transmission-reception unit 125 transmits one or more first partitioned matrices stored in the storage unit to DPUs directly connected to that DPU out of the other DPUs connected to each other in a torus-like manner in the row direction (S42). For each DPU, the matrix transmission-reception unit 125 transmits one or more second partitioned matrices stored in the storage unit to DPUs directly connected to that DPU out of the other DPUs connected to each other in a torus-like manner in the column direction, for example (S43).

In response to the matrix transmission-reception unit 125 receiving one or more first partitioned matrices and one or more second partitioned matrices from the other DPUs, the matrix computing unit 124 adds the second product of the one or more received first partitioned matrices and the one or more received second partitioned matrices to the first result matrix stored in the storage unit for each DPU, for example (S44).

The matrix computing unit 124 determines whether the product calculated from the one or more first partitioned matrices stored in the storage unit of each DPU is added to the first result matrix of each of the DPUs connected to each other in a torus-like manner, and whether the product calculated from the one or more second partitioned matrices stored in the storage unit of each DPU is added to the first result matrix in each of the DPUs connected to each other in a torus-like manner (S45).

As a result, when it is determined that the product is not added to the first result matrix in each of the DPUs connected to each other in a torus-like manner (NO in Step S45), the matrix computing unit 124 performs the processing in Step S42 and the subsequent steps again.

When it is determined that in the product is added to the first result matrix in each of the DPUs connected to each other in a torus-like manner (YES in Step S45), the matrix computing unit 124 determines whether the processing in Step S34 to Step S45 is performed for all the second partitioned matrices (S46). As a result, when it is determined that the processing in Step S34 to Step S45 is performed for all the second partitioned matrices (YES in Step S46), the matrix computing unit 124 ends the matrix computing processing. When it is determined that the processing in Step S34 to Step S45 is not performed for all the second partitioned matrices (NO in Step S46), the matrix computing unit 124 performs the processing in Step S34 and the subsequent steps again.

Specifically, when the processing in Step S35 is performed for the second time, as illustrated in FIG. 29, the matrix storage unit 123 stores only the second partitioned matrices located in the 13th row to the 24th row and located in the first column to the fourth column out of one or more second partitioned matrices illustrated in FIG. 19 in the storage units of the DPUs, for example. When the processing in Step S41 is performed for the second time, the matrix computing unit 124 adds the first product of the first partitioned matrices stored in the storage units of the DPUs in the processing in Step S34 and the second partitioned matrices stored in the storage units of the DPUs in the processing in Step S35 that is performed for the second time to the first result matrix (the submatrix located in the first column to the fourth column of the third matrix MC illustrated in FIG. 19), for example.

Figure 30:
FIG. 30 is a diagram illustrating the details of the matrix computing processing in the first embodiment.

When the processing in Step S35 is performed for the third time, as illustrated in FIG. 30, the matrix storage unit 123 stores only the second partitioned matrices located in the first row to the 12th row and located in the fifth column to the eighth column out of one or more second partitioned matrices illustrated in FIG. 19 in the storage units of the DPUs, for example. When the processing in Step S41 is performed for the third time, the matrix computing unit 124 adds the first product of the first partitioned matrices stored in the storage units of the DPUs in the processing in Step S34 and the second partitioned matrices stored in the storage units of the DPUs in the processing in Step S35 that is performed for the third time to the first result matrix (the submatrix located in the fifth column to the eighth column in the third matrix MC illustrated in FIG. 19), for example. The description of a specific example of a case in which the processing in Step S35 and the like are performed for the fourth time is omitted.

As a result, the information processing apparatus 1 can calculate the product of the first matrix MA and the second matrix MB efficiently (at high-speed).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computing method of calculating a product of a first matrix and a second matrix in an information processing apparatus including M×N computing elements configured such that M computing elements arranged in a row direction and N computing elements arranged in a column direction are connected to each other in a torus-like manner, where the M is an integer of 1 or more and the N is an integer of 1 or more, and the M is not equal to the N, the computing method comprising:

first generating, by a processor, one or more first partitioned matrices by partitioning the first matrix by a least common multiple of the M and the N in the row direction and by the N in the column direction;

second generating, by a processor, one or more second partitioned matrices by partitioning the second matrix by the M in the row direction and by the least common multiple in the column direction;

first storing, by a processor, the one or more generated first partitioned matrices in storage units of the computing elements so that the one or more first partitioned matrices located in the same column in the first matrix are stored in the computing elements arranged in different columns in the information processing apparatus;

second storing, by a processor, the one or more generated second partitioned matrices in the storage units so that the one or more second partitioned matrices located in the same row in the second matrix are stored in the computing elements arranged in different rows in the information processing apparatus;

first adding, by a processor, a first product of a matrix including the one or more first partitioned matrices and a matrix including the one or more second partitioned matrices stored in the storage unit of each of the computing elements, to a first result matrix stored in the storage unit of each of the computing elements, for each of the computing elements;

first transmitting, by a processor, for each of the computing elements, the one or more first partitioned matrices corresponding to the first product out of the one or more first partitioned matrices stored in the storage unit of each of the computing elements, to computing elements directly connected to that computing element out of other computing elements connected to each other in a torus-like manner in the row direction;

second transmitting, by a processor, for each of the computing elements, the one or more second partitioned matrices corresponding to the second product out of the one or more second partitioned matrices stored in the storage unit of each of the computing elements, to computing elements directly connected to that computing element out of other computing elements connected to each other in a torus-like manner in the column direction;

second adding, by a processor, after the reception of the one or more first partitioned matrices and the one or more second partitioned matrices from other computing elements, a second product of a matrix including the one or more received first partitioned matrices and a matrix including the one or more received one or more second partitioned matrices, to the first result matrix stored in the storage unit of each of the computing elements, for each of the computing elements; and first repeating, by a processor, the first transmitting, the second transmitting and the second adding, until multiple the products calculated from the one or more first partitioned matrices stored in the storage unit of each of the computing elements are added to the first result matrix in each of the computing elements connected to each other in a torus-like manner, and a plurality of product calculated from the one or more second partitioned matrices stored in the storage unit of each of the computing elements is added to the first result matrix in each of the computing elements connected to each other in a torus-like manner.

2. The computing method according to claim 1, further comprising, when the one or more first partitioned matrices or the one or more second partitioned matrices are received from other computing elements, storing, by a processor, the one or more received first partitioned matrices or the one or more received second partitioned matrices in the storage unit, wherein the second adding includes:
   sequentially acquiring the one or more first partitioned matrices and the one or more second partitioned matrices that are received the earliest from the storage unit of each of the computing elements, for each of the computing elements; and sequentially adding the second product of the one or more acquired first partitioned matrices and the one or more acquired second partitioned matrices, to the first result matrix stored in the storage unit of each of the computing elements, for each of the computing elements.

3. The computing method according to claim 1, wherein:
   the first generating includes generating the one or more first partitioned matrices by partitioning the first matrix by a number obtained by multiplying the least common multiple and a first integer together in the row direction and by a number obtained by multiplying the N and a second integer together in the column direction;

the second generating includes generating the one or more second partitioned matrices by partitioning the second matrix by a number obtained by multiplying the M and a third integer together in the row direction and by a number obtained by multiplying the least common multiple and a fourth integer together in the column direction;

the first storing includes storing the one or more first partitioned matrices in the storage units so that the first partitioned matrices for every second integer located in the same column in the first matrix are stored in the computing elements arranged in different columns in the information processing apparatus and the first partitioned matrices of which number in the row direction is the first integer and of which number in the column direction is the second integer are stored in the storage unit of each of the computing elements; and the second storing includes storing the one or more second partitioned matrices in the storage units so that the second partitioned matrices for every third integer located in the same row in the second matrix are stored in the computing elements arranged in different rows in the information processing apparatus and the second partitioned matrices of which number in the row direction is the third integer and of which number in the column direction is the fourth integer are stored in the storage unit of each of the computing elements.

4. The computing method according to claim 1, wherein:
the second generating includes generating the one or more second partitioned matrices by partitioning the second matrix by a number obtained by multiplying the M and a first integer together in the row direction and by a number obtained by multiplying the least common multiple and a second integer together in the column direction; and
the second storing includes storing, in the storage unit of each of the computing elements, the one or more second partitioned matrices of which number in the row direction is the M and of which number in the column direction is the least common multiple out of the one or more second partitioned matrices so that the one or more second partitioned matrices located in the same row in the second matrix are stored in the computing elements arranged in different rows in the information processing apparatus,
the method further comprising second repeating the second storing, the first adding, the first transmitting, the second transmitting, the second adding and the first repeating, until each step is performed for all of the one or more second partitioned matrices.

5. The computing method according to claim 4, wherein the second repeating includes parallelly second storing for the one or more second partitioned matrices on which the next step is to be performed.

6. The computing method according to claim 1, wherein:
the computing elements each include k unit computing elements connected to each other in a torus-like manner, where k is an integer of 1 or more;
the first adding includes:
third generating one or more unit partition values by partitioning the one or more first partitioned matrices stored in the storage unit of each of the computing elements by the k in each of the row direction and the column direction, for each of the computing elements;
third storing the generated one or more unit partition values in a unit storage unit of each of the unit computing elements so that the one or more unit partition values located in the same column of the one or more first partitioned matrices stored in the storage unit of each of the computing elements are stored in the same unit computing element, for each of the computing elements;
fourth generating one or more unit partitioned matrices by partitioning the one or more second partitioned matrices stored in the storage unit of each of the computing elements by the k in the column direction, for each of the computing elements;
fourth storing the generated one or more unit partitioned matrices in the unit storage unit of each of the unit computing elements, for each of the computing elements;
third adding a third product of a unit partition value corresponding to identification information for identifying each of the unit computing elements out of the one or more unit partition values stored in the unit storage unit of each of the unit computing elements and the one or more unit partitioned matrices stored in the unit storage unit of each of the unit computing elements, to a second result matrix stored in the unit storage unit of each of the unit computing elements, for each of the unit computing elements;
third transmitting, for each of the unit computing elements, the one or more unit partitioned matrices stored in the unit storage unit of each of the unit computing elements, to unit computing elements directly connected to that unit computing element out of other unit computing elements connected to each other in a torus-like manner;
fourth adding, in response to the reception of the one or more unit partitioned matrices from other unit computing elements, a fourth product of the one or more unit partitioned matrices received from the other unit computing elements and a unit partition value corresponding to identification information for identifying another unit computing element that has first stored therein the received one or more unit partitioned matrices out of the one or more unit partition values stored in the unit storage unit of each of the unit computing elements, to the second result matrix stored in the unit storage unit, for each of the unit computing elements; and
repeating the third transmitting and the fourth adding until the product calculated from the one or more unit partitioned matrices stored in the unit storage unit of each of the unit computing elements is added to the second result matrix of each of the unit computing elements connect to each other in a torus-like manner;
the first transmitting includes transmitting a matrix including the second result matrices stored in the unit storage unit of each of the unit computing elements as the one or more first partitioned matrices, for each of the unit computing elements; and
the second transmitting includes transmitting a matrix including the second result matrices stored in the unit storage unit of each of the unit computing elements as the one or more second partitioned matrices, for each of the unit computing elements.

7. The computing method according to claim 6, wherein:
the unit computing element includes first identification information for identifying each of the unit computing elements;
the third storing includes storing, in association with each other, the unit partition value and second identification information for identifying each partition value, for each of the unit computing elements;
the third adding includes:
specifying the first identification information corresponding to each of the unit computing elements for each of the unit computing elements; and
adding the third product of a unit partition value corresponding to the specified first identification information out of the unit partition values stored in the unit storage unit of each of the unit computing elements and the unit partitioned matrix stored in the unit storage unit of each of the unit computing elements, to the second result matrix stored in the unit storage unit of each of the unit computing elements, for each of the unit computing elements; and the fourth adding includes:
specifying second identification information corresponding to another unit computing element that has first stored therein the received unit partitioned matrix, for each of the unit computing elements; and adding the fourth product of the received unit partitioned matrix and a unit partition value corresponding to the specified second identification information out of the unit partition values stored in the unit storage unit of each of the unit computing elements, to the second result matrix stored in the unit storage unit, for each of the unit computing elements.

8. The computing method according to claim 1, further comprising outputting the first result matrix after the first repeating.

9. The computing method according to claim 1, wherein:
in the first storing, the one or more generated first partitioned matrices are stored for each of the one or more first partitioned matrices of which number in the row direction is a number obtained by dividing the least common multiple by the M and of which number in the column direction is 1; and
in the second storing, the one or more generated second partitioned matrices are stored for each of the one or more second partitioned matrices of which number in the row direction is 1 and of which number in the column direction is a number obtained by dividing the least common multiple by the N.

10. The computing method according to claim 1, wherein:
in the first storing, the one or more generated first partitioned matrices are stored for each of the one or more first partitioned matrices of which number in the row direction is a number obtained by dividing the least common multiple by the M and of which number in the column direction is 1, each the one or more generated first partitioned matrices is rearranged from location expressed by Expression 1 to location expressed by Expression 2; and
in the second storing, the one or more generated second partitioned matrices are stored for each of the one or more second partitioned matrices of which number in the row direction is 1 and of which number in the column direction is a number obtained by dividing the least common multiple by the N, each the one or more generated second partitioned matrices is rearranged from location expressed by Expression 3 to location expressed by Expression 4;

$$A[y][x] \quad \text{Expression 1}$$

$$A[y][((L-1)-x+(N-y)*(L/N)\% L] \quad \text{Expression 2}$$

$$B[y][x] \quad \text{Expression 3}$$

$$B[((L-1)-y+(M-x)*(L/M)\% L][x] \quad \text{Expression 4}$$

wherein L is a constant indicating the least common multiple, x is a variable indicating an order from the left of the one or more first partitioned matrices or the one or more second partitioned matrices, y is a variable indicating an order from the top of the one or more first partitioned matrices or the one or more second partitioned matrices, A[y][x] is a variable indicating the location where y-th from the left and x-th from the top out of the location where the one or more first partitioned matrices is located, B[y][x] is a valuable indicating the location where y-th from the left and x-th from the top out of the location where the one or more second partitioned matrices is located.

11. An information processing apparatus including M×N computing elements configured such that M computing elements arranged in a row direction and N computing elements arranged in a column direction are connected to each other in a torus-like manner, where the M is an integer of 1 or more and the N is an integer of 1 or more, and the M is not equal to the N, the information processing apparatus including:
a first matrix partition unit configured to generate one or more first partitioned matrices by partitioning a first matrix by a least common multiple of the M and the N in the row direction and by the N in the column direction;
a second matrix partition unit configured to generate one or more second partitioned matrices by partitioning a second matrix by the M in the row direction and by the least common multiple in the column direction;
a matrix storage unit configured to store the one or more generated first partitioned matrices in storage units of the computing elements so that the one or more first partitioned matrices located in the same column in the first matrix are stored in the computing elements arranged in different columns in the information processing apparatus, and store the one or more generated second partitioned matrices in the storage units so that the one or more second partitioned matrices located in the same row in the second matrix are stored in the computing elements arranged in different rows in the information processing apparatus;
a matrix computing unit configured to add a first product of a matrix including the one or more first partitioned matrices and a matrix including the one or more second partitioned matrices stored in the storage unit of each of the computing elements, to a first result matrix stored in the storage unit of each of the computing elements, for each of the computing elements; and
a matrix transmission-reception unit configured to transmit, for each of the computing elements, the one or more first partitioned matrices corresponding to the first product out of the one or more first partitioned matrices stored in the storage unit of each of the computing elements, to computing elements directly connected to that computing element out of other computing elements connected to each other in a torus-like manner in the row direction, and transmit, for each of the computing elements, the one or more second partitioned matrices corresponding to the second product out of the one or more second partitioned matrices stored in the storage unit of each of the computing elements, to computing elements directly connected to that computing element out of other computing elements connected to each other in a torus-like manner in the column direction, wherein:
the matrix computing unit is configured to add, after the reception of the one or more first partitioned matrices and the one or more second partitioned matrices from other computing elements, a second product of a matrix including the one or more received first partitioned matrices and a matrix including the one or more received one or more second partitioned matrices, to the first result matrix stored in the storage unit of each of the computing elements, for each of the computing elements;
the matrix transmission-reception unit is configured to repeat the transmitting of the first partitioned matrices and the transmitting of the second partitioned matrices, until multiple the products calculated from the one or more first partitioned matrices stored in the storage unit of each of the computing elements are added to the first result matrix in each of the computing elements connected to each other in a torus-like manner, and a plurality of the product calculated from the one or more second partitioned matrices stored in the storage unit of each of the computing elements is added to the first result matrix in each of the computing elements connected to each other in a torus-like manner; and the matrix computing unit is configured to repeat the adding of the second product until multiple the products calculated from the one or more first partitioned matrices stored in the storage unit of each of the computing elements are added to the first result matrix in each of the computing elements connected to each other in a torus-like manner, and a plurality of product calculated from the one or more second partitioned matrices stored in the storage unit of each of the computing elements is added to the first result matrix in each of the computing elements connected to each other in a torus-like manner.

12. An information processing system comprising:

an information processing apparatus including M×N computing elements configured such that M computing elements arranged in a row direction and N computing elements arranged in a column direction are connected to each other in a torus-like manner, where the M is an integer of 1 or more and the N is an integer of 1 or more, and the M is not equal to the N; and a storage apparatus configured to store a first matrix and a second matrix therein, the information processing apparatus including:

a first matrix partition unit configured to generate one or more first partitioned matrices by partitioning the first matrix stored in the storage apparatus by a least common multiple of the M and the N in the row direction and by the N in the column direction;

a second matrix partition unit configured to generate one or more second partitioned matrices by partitioning the second matrix stored in the storage apparatus by the M in the row direction and by the least common multiple in the column direction;

a matrix storage unit configured to store the one or more generated first partitioned matrices in storage units of the computing elements so that the one or more first partitioned matrices located in the same column in the first matrix are stored in the computing elements arranged in different columns in the information processing apparatus, and store the one or more generated second partitioned matrices in the storage units so that the one or more second partitioned matrices located in the same row in the second matrix are stored in the computing elements arranged in different rows in the information processing apparatus;

a matrix computing unit configured to add a first product of a matrix including the one or more first partitioned matrices and a matrix including the one or more second partitioned matrices stored in the storage unit of each of the computing elements, to a first result matrix stored in the storage unit of each of the computing elements, for each of the computing elements; and a matrix transmission-reception unit configured to transmit, for each of the computing elements, the one or more first partitioned matrices corresponding to the first product out of the one or more first partitioned matrices stored in the storage unit of each of the computing elements, to computing elements directly connected to that computing element out of other computing elements connected to each other in a torus-like manner in the row direction, and transmit, for each of the computing elements, the one or more second partitioned matrices corresponding to the second product out of the one or more second partitioned matrices stored in the storage unit of each of the computing elements, to computing elements directly connected to that computing element out of other computing elements connected to each other in a torus-like manner in the column direction, wherein:

the matrix computing unit is configured to add, after the reception of the one or more first partitioned matrices and the one or more second partitioned matrices from other computing elements, a second product of a matrix including the one or more received first partitioned matrices and a matrix including the one or more received one or more second partitioned matrices, to the first result matrix stored in the storage unit of each of the computing elements, for each of the computing elements;

the matrix transmission-reception unit is configured to repeat the transmitting of the first partitioned matrices and the transmitting of the second partitioned matrices, until multiple the products calculated from the one or more first partitioned matrices stored in the storage unit of each of the computing elements are added to the first result matrix in each of the computing elements connected to each other in a torus-like manner, and a plurality of product calculated from the one or more second partitioned matrices stored in the storage unit of each of the computing elements is added to the first result matrix in each of the computing elements connected to each other in a torus-like manner; and the matrix computing unit is configured to repeat the adding of the second product until multiple the products calculated from the one or more first partitioned matrices stored in the storage unit of each of the computing elements are added to the first result matrix in each of the computing elements connected to each other in a torus-like manner, and a plurality of product calculated from the one or more second partitioned matrices stored in the storage unit of each of the computing elements is added to the first result matrix in each of the computing elements connected to each other in a torus-like manner.

* * * * *